United States Patent
Kitayama et al.

(10) Patent No.: US 7,035,175 B2
(45) Date of Patent: Apr. 25, 2006

(54) OFFSET MEASURING METHOD

(75) Inventors: Machiko Kitayama, Nara (JP);
Masaya Kuwahara, Osaka (JP);
Yasuhiro Tai, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 505 days.

(21) Appl. No.: 10/221,877

(22) PCT Filed: Mar. 25, 2002

(86) PCT No.: PCT/JP02/02864

§ 371 (c)(1),
(2), (4) Date: Sep. 16, 2002

(87) PCT Pub. No.: WO02/080156

PCT Pub. Date: Oct. 10, 2002

(65) Prior Publication Data

US 2003/0137907 A1 Jul. 24, 2003

(30) Foreign Application Priority Data

Mar. 29, 2001 (JP) .............................. 2001-93735

(51) Int. Cl.
*G11B 7/095* (2006.01)

(52) U.S. Cl. .............................. 369/44.29; 369/44.32; 369/44.35

(58) Field of Classification Search ............. 369/44.32, 369/44.35, 44.36, 44.29, 53.28, 53.19, 44.23
See application file for complete search history.

(56) References Cited

U.S. PATENT DOCUMENTS

| | | | | |
|---|---|---|---|---|
| 5,481,526 A | * | 1/1996 | Nagata et al. | 369/44.29 |
| 5,499,223 A | * | 3/1996 | Yanagi et al. | 369/44.28 |
| 5,627,808 A | * | 5/1997 | Hajjar et al. | 369/44.32 |
| 5,917,789 A | * | 6/1999 | Iwasaki et al. | 369/44.28 |
| 6,147,944 A | * | 11/2000 | Kwon et al. | 369/44.32 |
| 6,452,879 B1 | * | 9/2002 | Tsukahara et al. | 369/44.36 |
| 2002/0021632 A1 | * | 2/2002 | Park | 369/44.28 |

FOREIGN PATENT DOCUMENTS

| | | |
|---|---|---|
| JP | 08-194540 | 7/1996 |
| JP | 2000-251289 | 9/2000 |
| JP | 2000-222749 | 11/2000 |

* cited by examiner

*Primary Examiner*—Hoa T. Nguyen
*Assistant Examiner*—Van Pham
(74) *Attorney, Agent, or Firm*—Renner, Otto, Boisselle & Sklar, LLP

(57) ABSTRACT

An offset measuring method is for measuring an offset based on an optical beam reflected by an information medium, in a recording and reproduction apparatus including an optical pickup placed on transportation means so as to be driven along a radial direction of the information medium. The method includes the steps of directing an optical beam toward a first measuring position, thereby measuring a first offset amount based on the optical beam reflected at the first measuring position; moving the transportation means by a first distance in a first direction along the radial direction; driving the optical pickup by a second distance, which is equal to the first distance, in a second direction; and directing an optical beam toward a second measuring position, thereby measuring a second offset amount based on the optical beam reflected at the second measuring position.

12 Claims, 25 Drawing Sheets

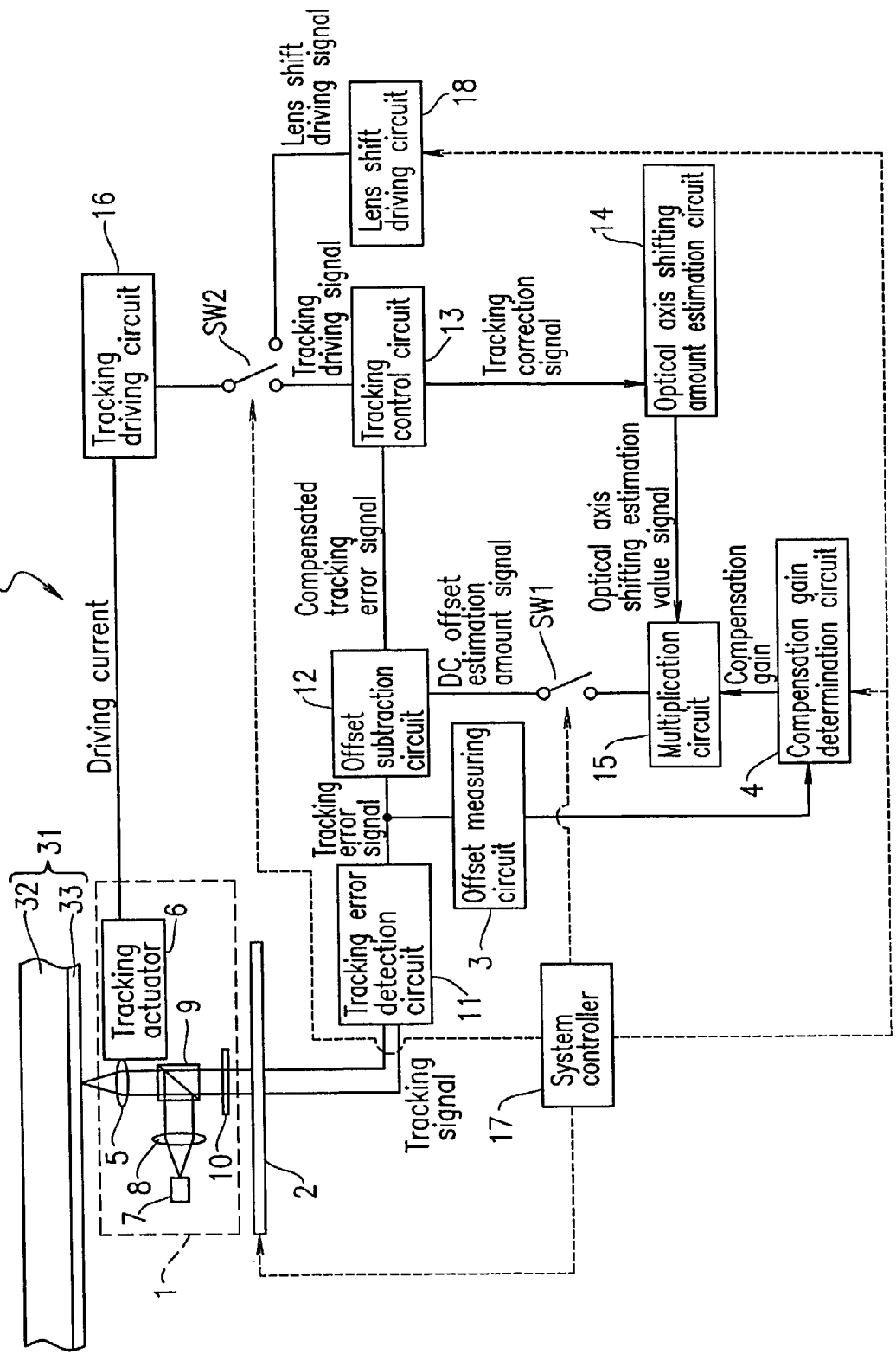

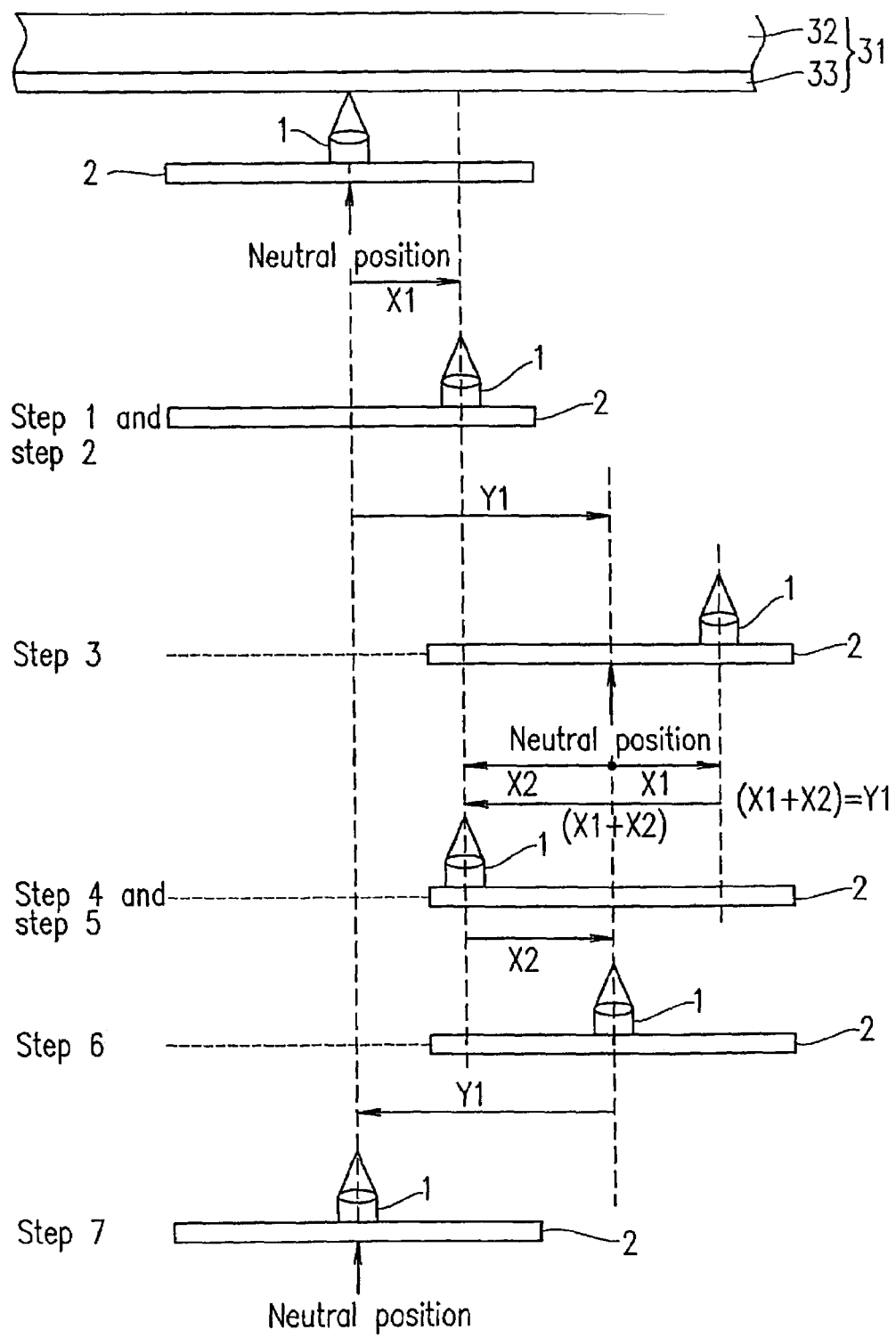

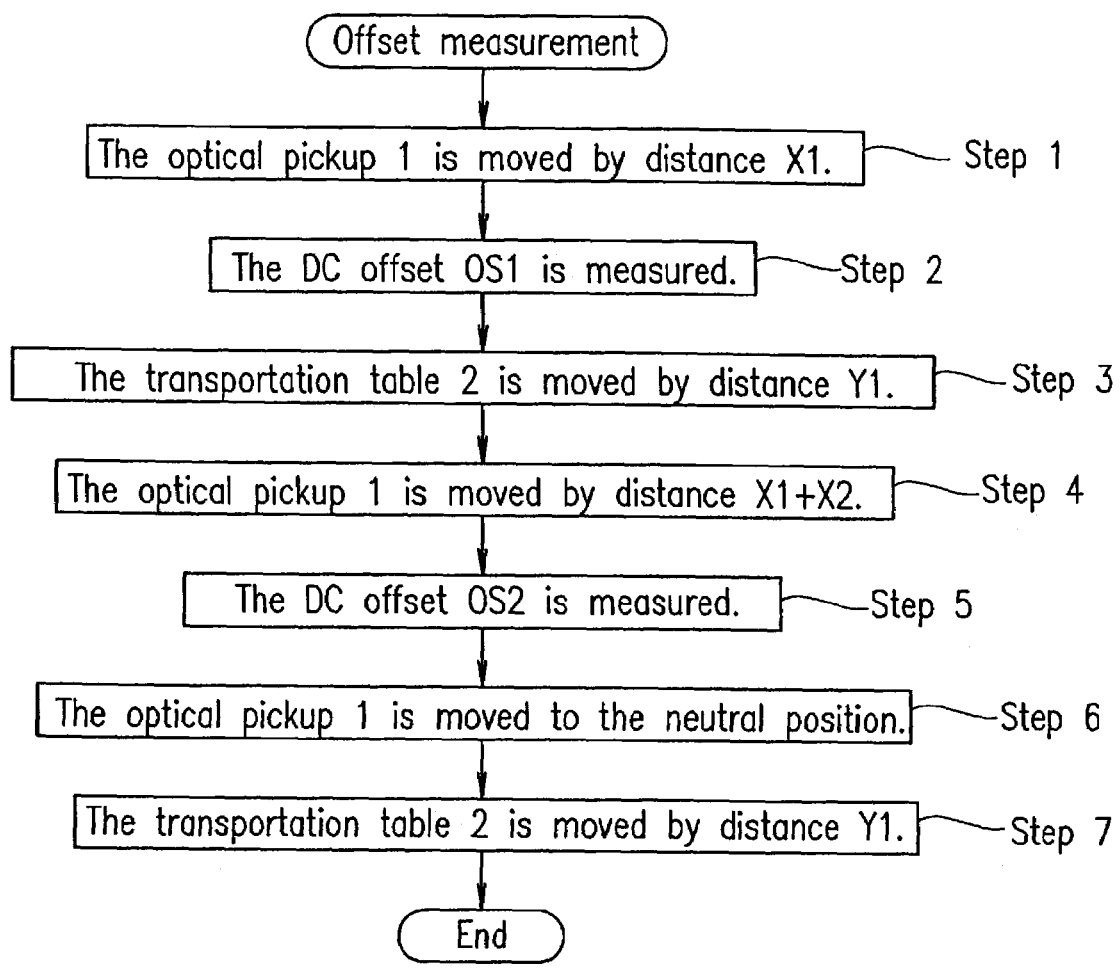

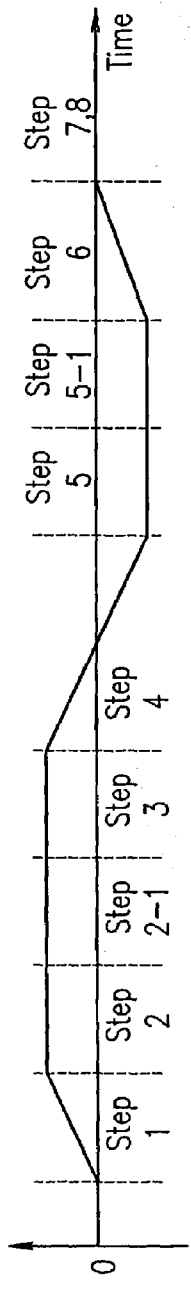
FIG. 4A Lens shift driving signal [V]
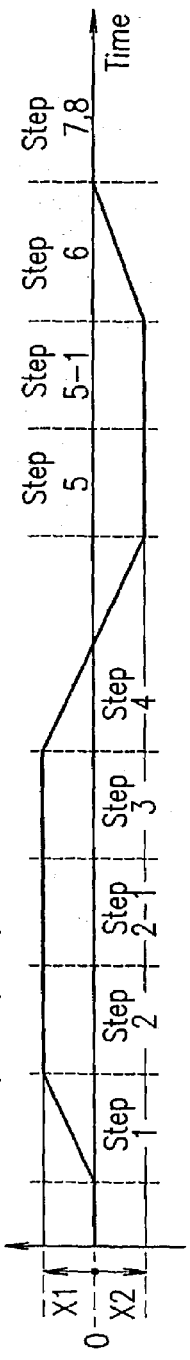
FIG. 4B Position of the optical pickup
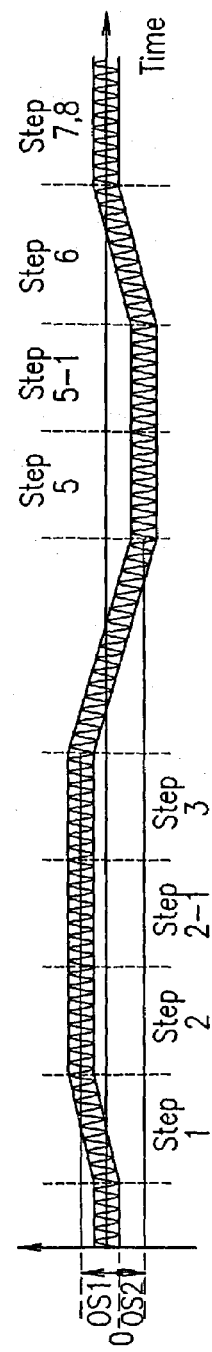
FIG. 4C Tracking error signal [mV]

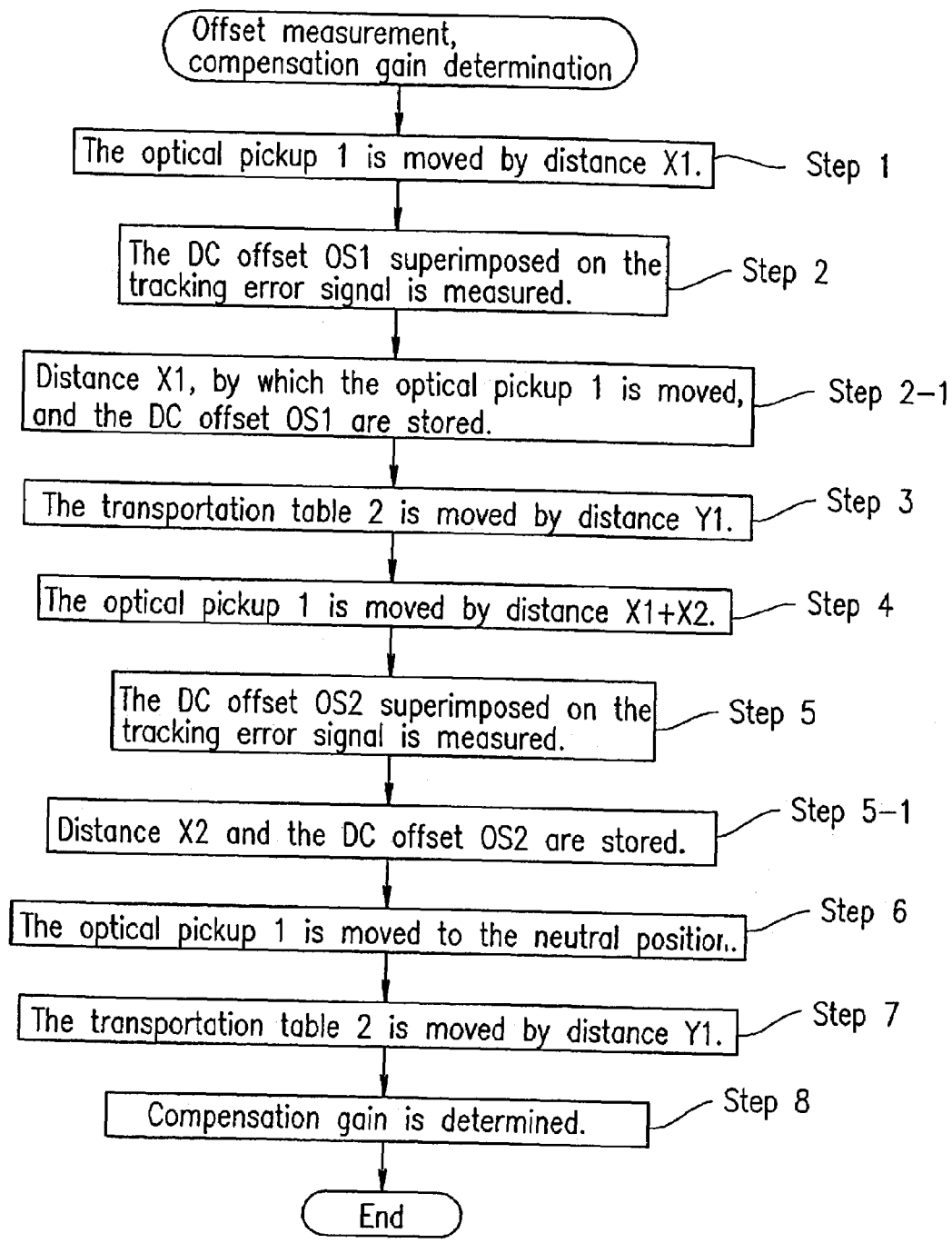

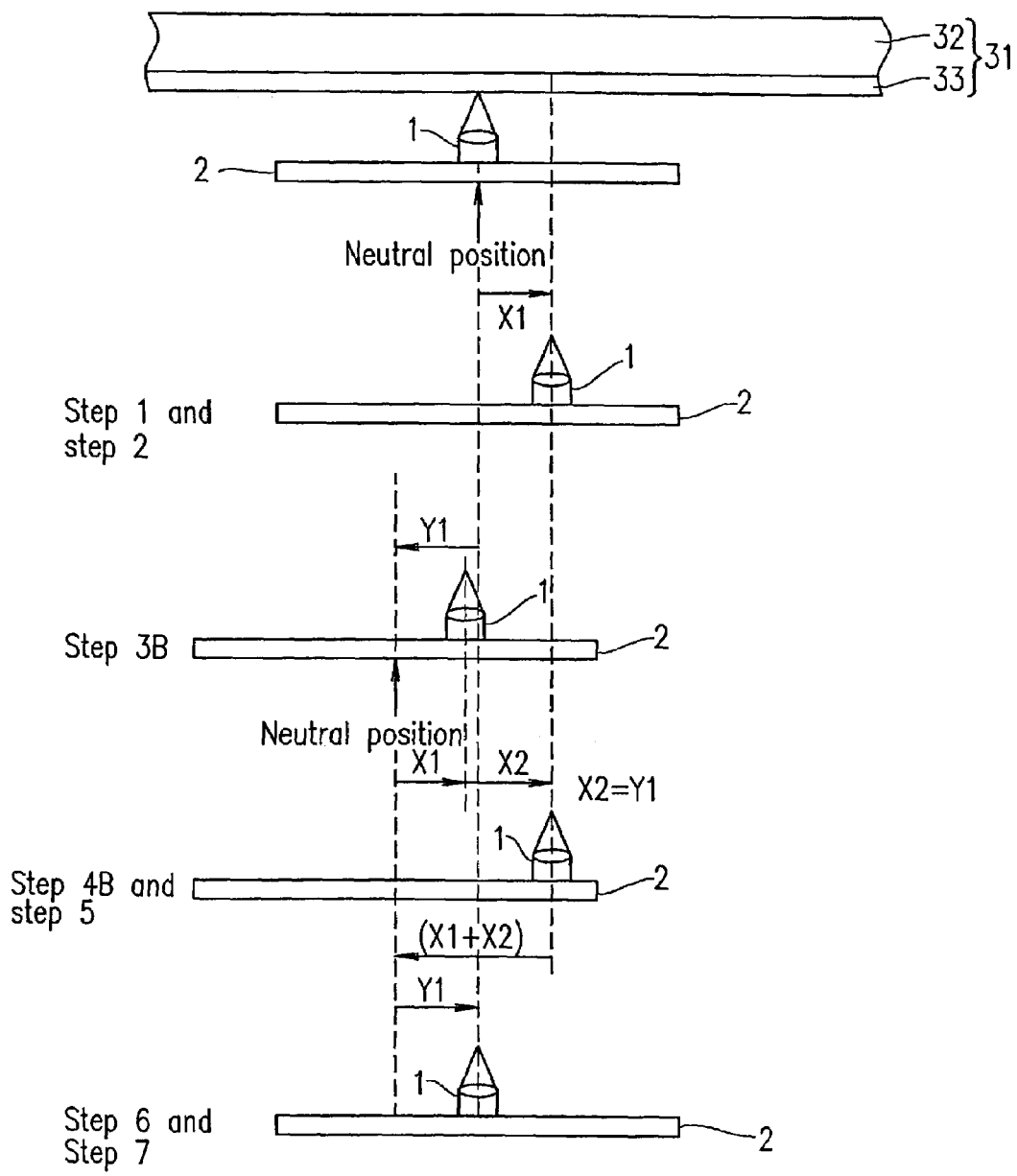

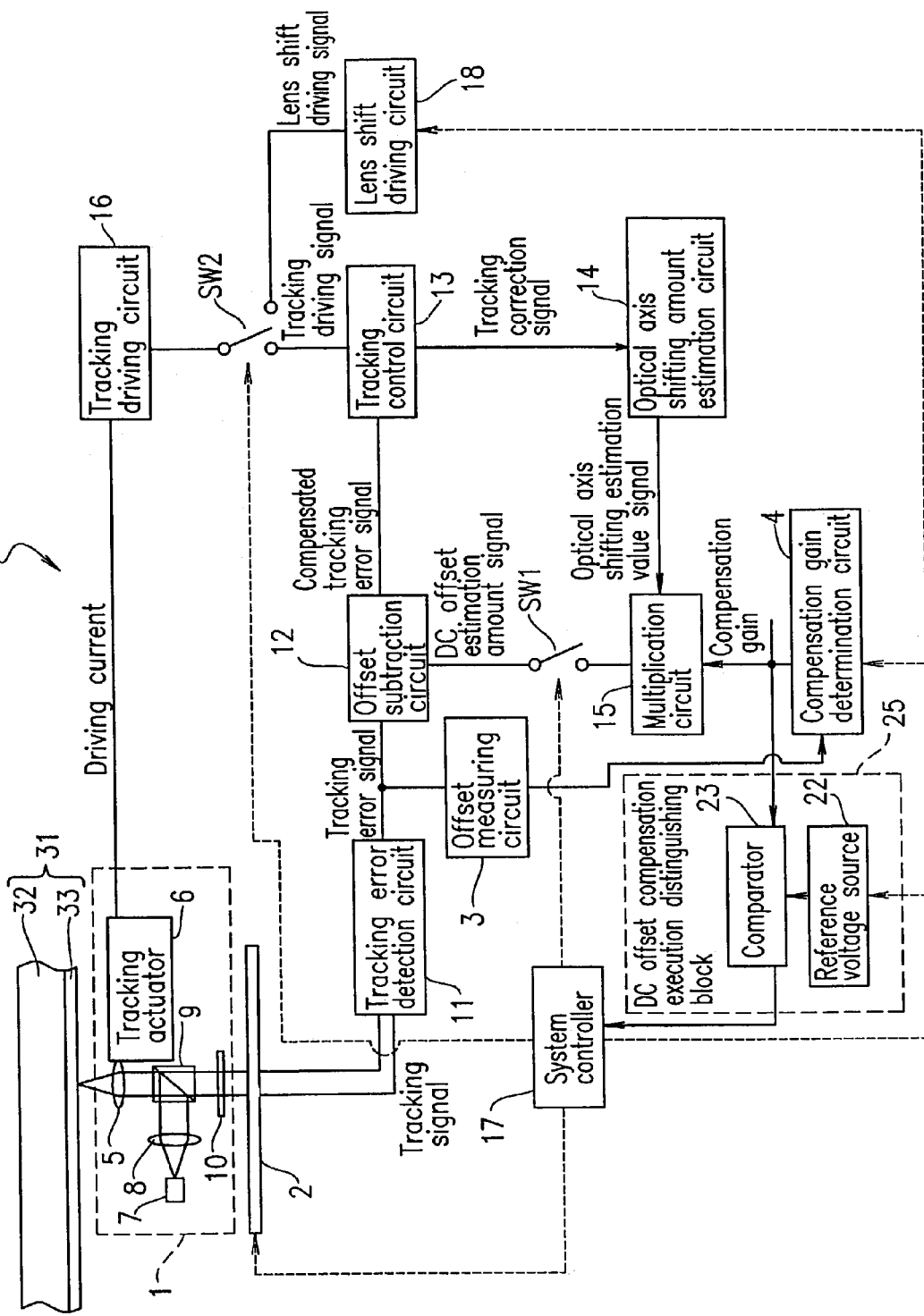

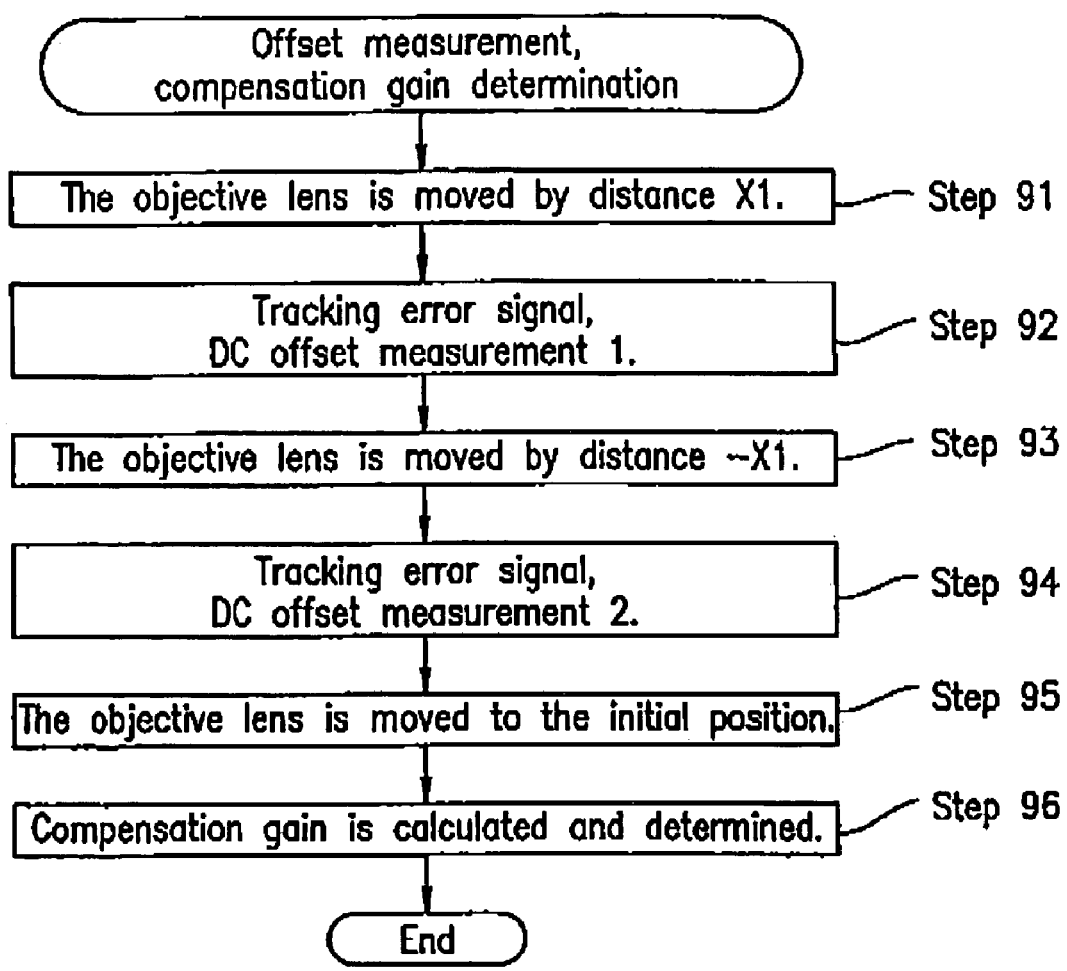

OFFSET MEASURING METHOD

TECHNICAL FIELD

The present invention relates to an offset measuring method for measuring an offset which is generated by a shift in an optical axis of an objective lens for collecting an optical beam onto an information medium, and a recording and reproduction apparatus for performing the offset measuring method.

BACKGROUND ART

There are today a variety of types of information mediums having an information layer, which is irradiated with an optical beam so that prescribed information is recorded on the information layer and/or information recorded on the information layer is reproduced. The variety of types of information mediums are different in thickness thereof and/or in material of the information layer and/or in structure of the information layer. These variety of types of information mediums are all disc-shaped (hereinafter, these information mediums will be referred to as "discs"), and can be exchangeably used in common recording and reproduction apparatuses.

These discs include recordable discs usable for information recording and reproduction, represented by, for example, DVD-RAM discs and DVD-R discs, and reproduction-only discs only usable for information reproduction, represented by DVD-ROM discs. In order to record information on or reproduce information from a recordable disc, or in order to reproduce information from a reproduction-only disc, it is necessary to position an optical beam to the center of a track provided on a disc by tracking control.

FIG. 14 is a block diagram illustrating a principle of tracking control of a conventional recording and reproduction apparatus. A disc 31, on which the recording and reproduction apparatus records information or from which the recording and reproduction apparatus reproduces information, includes a substrate 32. An information layer 33 used for information recording and reproduction is formed on the substrate 32. The recording and reproduction apparatus includes an optical pickup 1 provided so as to face the information layer 33 formed in the disc 31. The optical pickup 1 includes an objective lens and a photodetector having two light receiving sections. The objective lens provided in the optical pickup 1 collects an optical beam onto the information layer 33. The photodetector receives the optical beam reflected by the information layer 33, converts the received optical beam into a tracking signal, and outputs the tracking signal to a tracking error detection circuit 11. Based on the tracking signal converted by the photodetector provided in the optical pickup 1, the tracking error detection circuit 11 detects a tracking error signal representing an error, along a radial direction of the information medium 31, between the position of the optical beam collected onto the information layer 33 and the central position of the track formed on the information layer 33. Then, the tracking error detection circuit 11 outputs the tracking error signal to a tracking control circuit 13. Based on the tracking error signal detected by the tracking error detection circuit 11, the tracking control circuit 13 generates a tracking driving signal for performing phase compensation, such that the position of the optical beam collected onto the information layer 33 tracks a control target position representing the central position of the track formed on the information layer 33. Then, the tracking control circuit 13 outputs the tracking driving signal to a tracking driving circuit 16. Based on the tracking driving signal generated by the tracking control circuit 13, the tracking driving circuit 16 controls the position of the objective lens provided in the optical pickup 1 such that the position of the optical beam collected onto the information layer 33 tracks the central position of the track.

Many systems by which the tracking error detection circuit 11 detects a tracking error signal have been proposed and put into practice. A representative system for detecting a tracking error signal from an optical beam reflected by a recordable disc usable for information recording and reproduction is a push-pull system. Hereinafter, the push-pull system will be described.

According to the push-pull system, a difference, in light intensity of an optical beam received by the two light receiving sections which are located so as to be symmetrical with respect to the central position of the track formed on the information layer 33, is detected as a tracking error signal.

The light intensity of the optical beam reflected by the information layer 33 significantly relies on the depth of a groove of the track formed in the information layer 33 or the depth of a pit formed on the information layer 33.

The information layer 33 has, for example, a concaved portion (hereinafter, referred to as a "groove portion") which is a spiral groove formed therein and a convexed portion (hereinafter, referred to as a "land portion") between the concaved portions. An optical path length of the optical beam reflected by the groove portion is longer than an optical path length of the optical beam reflected by the land portion by twice the depth of the groove. Therefore, the waveform of the optical beam reflected by the groove portion and the waveform of the optical beam reflected by the land portion have a phase difference corresponding to a length which is twice the depth of the groove.

FIG. 15 is a graph illustrating the relationship between the depth of the groove of the track formed in the information layer 33 and the intensity of the tracking signal converted from the optical beam reflected by the information layer 33. The horizontal axis represents the depth of the groove portion provided in the information layer 33, and $\lambda$ represents the wavelength of the optical beam, which is directed to the information layer 33 by the optical pickup 1 (or with which the optical pickup 1 irradiates the information layer 33). The vertical axis represents the intensity of the tracking signal detected by the photodetector provided in the optical pickup 1.

When the depth of the groove portion provided in the information layer 33 of the disc 31 is $\lambda/4$, the optical path length of the optical beam reflected by the groove portion is longer than the optical path length of the optical beam reflected by the land portion by $\lambda/2$, which is twice as long as the depth of the groove, i.e., $\lambda/4$. Accordingly, the waveform of the optical beam reflected by the groove portion and the waveform of the optical beam reflected by the land portion have a phase difference of $\pi/2$ corresponding to $\lambda/2$, which is twice the depth of the groove. Therefore, the waveform of the optical beam reflected by the groove portion and the waveform of the optical beam reflected by the land portion counteract each other. As a result, the intensity of the tracking signal detected by the photodetector provided in the optical pickup 1 is minimum as shown in FIG. 15.

When the depth of the groove is $\lambda/8$, the optical path length of the optical beam reflected by the groove portion is longer than the optical path length of the optical beam reflected by the land portion by $\lambda/4$, which is twice as long as the depth of the groove, i.e., $\lambda/8$. Accordingly, a phase difference of $\pi/4$ corresponding to $\lambda/4$, which is twice the depth of the groove, is caused. At this point, the intensity of the tracking signal detected by the photodetector provided in the optical pickup 1 is maximum as shown in FIG. 15. When the depth of the groove is $\lambda/8$ to $\lambda/6$, the intensity of the tracking signal does not significantly decrease from the maximum intensity obtained when the depth of the groove is $\lambda/8$. This is why the depth of the groove portion provided in a DVD-R disc, which is a recordable disc usable for information recording and reproduction, is set to be equal to or more than $\lambda/8$ and equal to or less than $\lambda/6$.

When the center of the optical axis of the objective lens, of the optical pickup 1, for collecting the optical beam onto the information layer 33 is shifted from the border between the two light receiving sections provided in the photodetector (hereinafter, this shifting will be referred to as a "lens optical axis shifting"), the intensity of the optical beam received by one of the two light receiving sections is higher than the intensity of the optical beam received by the other of the two light receiving sections. As a result, a DC offset is superimposed on a tracking error signal detected by the tracking error detection circuit 11.

FIG. 16 illustrates the positional relationship between the center of the optical axis of an optical beam and the two light receiving sections provided in the photodetector. In the photodetector 10 provided in the optical pickup 1 (FIG. 14), the two light receiving sections a and b are located so as to be in contact with each other and so as to be symmetrical with respect to the central position of the track formed on the information layer 33. The objective lens 5 provided in the optical pickup 1 (FIG. 14) is located such that an optical axis center A thereof matches the border between the light receiving sections a and b.

When the objective lens 5 is shifted from the position represented by the solid line to the position represented by the dashed line along a radial direction of the disc 31, the optical axis center A of the objective lens 5 is shifted toward the light receiving section b, to an optical axis center B, by distanced. Therefore, the center of the optical axis of the optical beam, which is incident on the photodetector 10 after being reflected and diffracted by the information layer 33 of the disc 31, is shifted toward the light receiving section b by distance d. As a result, the amount of light of the optical beam which is incident on the light receiving section a provided in the photodetector 10 is smaller than the amount of light of the optical beam which is incident on the light receiving section b. Thus, the amount of light incident on the light receiving section a and the amount of light incident on the light receiving section b becomes out of balance.

As described above, according to the push-pull system, a difference in the light intensity between the optical beams respectively received by the two light receiving sections is detected as a tracking error signal. Therefore, when the amounts of light incident on the two light receiving sections become out of balance due to the shifting of the center of the optical axis of the optical beam incident on the photodetector 10, a DC offset is superimposed on the tracking error signal. In a recordable disc such as a DVD-R disc or the like, the depth of the groove is set to be equal to or more than $\lambda/8$ and equal to or less than $\lambda/6$ such that the intensity of the tracking signal is not significantly reduced. Therefore, the amount of the DC offset superimposed on the tracking error signal is increased in the recordable disc.

When the DC offset is superimposed on the tracking error signal as described above, even when the optical beam is controlled based on the tracking error signal such that the position on the information layer 33 to which the optical beam is directed matches the center of the track, the actual position on the information layer 33 to which the optical beam is directed is shifted from the center of the track. Therefore, a system for compensating for the DC offset superimposed on the tracking error signal has been proposed.

FIG. 17 is a block diagram illustrating a principle of conventional tracking control having a function of compensating for a DC offset. Identical elements previously discussed with respect to FIG. 14 bear identical reference numerals and the detailed descriptions thereof will be omitted. The apparatus shown in FIG. 17 is different from the recording and reproduction apparatus described above with reference to FIG. 14 in that the apparatus shown in FIG. 17 further includes an optical axis shifting amount estimation circuit 14, a multiplication circuit 15 and a switching circuit SW1.

The optical axis shifting amount estimation circuit 14 generates a signal representing an optical axis shifting amount estimation value, which is an estimated value of the lens optical axis shifting amount, based on the tracking driving signal generated by the tracking control circuit 13. Then, the optical axis shifting amount estimation circuit 14 outputs the generated signal to the multiplication circuit 15. The multiplication circuit 15 multiplies the signal representing the optical axis shifting amount estimation value, which is output from the optical axis shifting amount estimation circuit 14, with a compensation gain, and then outputs the resultant signal representing a DC offset estimation amount to the switching circuit SW1. When the switch circuiting SW1 is turned on, the signal representing the DC offset estimation amount, which is output from the multiplication circuit 15, is added to the tracking error signal detected by the tracking error detection circuit 11. The DC offset superimposed on the tracking error signal is compensated for by the signal representing the DC offset estimation amount. When the switching circuit SW1 is turned off, the signal representing the DC offset estimation amount is not added to the tracking error signal. Thus, the switching circuit SW1 is structured so as to be capable of turning on or off a negative feedback based on the DC offset estimation amount.

The compensation gain, multiplied by the multiplication circuit 15 with the signal representing the optical axis shifting amount estimation value, is determined based on a measured DC offset which is superimposed on the tracking error signal. Hereinafter, a method for measuring a DC offset for determining the compensation gain and a method for determining the compensation gain based on the measured DC offset will be described.

FIG. 18 shows a structure of a conventional recording and reproduction apparatus 90. Identical elements to those of the recording and reproduction apparatus previously discussed with respect to FIG. 17 bear identical reference numerals and the detailed descriptions thereof will be omitted. The recording and reproduction apparatus 90 includes an optical pickup 1.

The optical pickup 1 is placed on a transportation table 2. The transportation table 2 having the optical pickup 1 placed thereon transports the optical pickup 1 along a radial direction of an information medium 31 based on an instruction from a system controller 17. In this manner, the optical pickup 1 is transported by the transportation table 2 and thus moved to an arbitrary position along the radial direction of the information medium 31, where the optical pickup 1 can operate to record information on or reproduce information from the information layer 33.

The optical pickup 1 has a light source 7. The light source 7 is formed of a red semiconductor laser device. The light source 7 oscillates an optical beam having a wavelength of 650 nanometers (nm) and emits the optical beam toward a collimator lens 8. The optical beam emitted from the light source 7 (hereinafter, referred also to as "emitted light") is converted into parallel light by the collimator lens 8, passes through a beam splitter 9, is converged by an objective lens 5, and is directed to the information layer 33 of the disc 31.

The optical beam reflected by the information layer 33 passes through the objective lens 5 and the beam splitter 9 and is incident on a photodetector 10 having two light receiving sections. The photodetector 10 outputs, as a tracking signal, a difference in the light intensity between the optical beams respectively received by the two light receiving sections to a tracking error detection circuit 11.

The optical pickup 1 includes a tracking actuator 6. Based on a driving current from a tracking driving circuit 16, the tracking actuator 6 moves the objective lens 5 with respect to the transportation table 2 along the radial direction of the information medium 31.

The tracking error detection circuit 11 detects a tracking error signal by the above-described push-pull system from the tracking signal output from the photodetector 10, and outputs the tracking error signal to an offset measuring circuit 3 and an offset subtraction circuit 12. The offset subtraction circuit 12 subtracts a signal representing a DC offset estimation amount from the tracking error signal detected by the tracking error detection circuit 11, and outputs the resultant compensated tracking error signal to a tracking control circuit 13. The DC offset estimation amount will be described later in detail.

Based on the compensated tracking error signal output from the offset subtraction circuit 12, the tracking control circuit 13 generates a tracking driving signal for performing phase compensation such that the position of the optical beam collected onto the information layer 33 tracks a control target position representing the central position of the track formed on the information layer 33. Then, the tracking control circuit 13 outputs the tracking driving signal to a switching circuit SW2.

In response to an instruction from the system controller 17, the switching circuit SW2 selects either a tracking driving signal output from the tracking control circuit 13 or a lens shift driving signal output from a lens shift driving circuit 18, and outputs the selected signal to the tracking driving circuit 16. For causing the position of the optical beam collected onto the information layer 33 to track the control target position, representing the central position of the track formed on the information layer 33 by tracking control, the switching circuit SW2 selects the tracking driving signal output from the tracking control circuit 13, and outputs the tracking driving signal to the tracking driving circuit 16. For measuring a DC offset for determining the compensation gain, or for transporting the optical pickup 1 to an arbitrary position along the radial direction of the information medium 31 by the transportation table 2, the switching circuit SW2 selects the lens shift driving signal output from the lens shift driving circuit 18, and outputs the lens shift driving signal to the tracking driving circuit 16. The lens shift driving signal output from the lens shift driving circuit 18 will be described below with reference to FIG. 21A.

In accordance with the tracking driving signal or the lens shift driving signal output from the switching circuit SW2, the tracking driving circuit 16 outputs a driving current, for moving the objective lens 5, to the tracking actuator 6. Based on the driving current from the tracking driving circuit 16, the tracking actuator 6 moves the objective lens 5 with respect to the transportation table 2 along the radial direction of the information medium 31.

Next, the DC offset estimation amount will be described in detail. The DC offset estimation amount is an estimated value of the DC offset which is superimposed on the tracking error signal when lens optical axis shifting occurs to the objective lens 5. The DC offset estimation amount is obtained as follows.

The offset measuring circuit 3 detects a maximum value and a minimum value of the tracking error signal detected by the tracking error detection circuit 11. The offset measuring circuit 3 calculates the difference between the detected maximum and minimum values so as to measure the DC offset superimposed on the tracking error signal. Then, the offset measuring circuit 3 outputs the DC offset to a compensation gain determination circuit 4. Based on the DC offset measured by the offset measuring circuit 3, the compensation gain determination circuit 4 determines the compensation gain and outputs the compensation gain to a multiplication circuit 15.

The tracking control circuit 13 outputs, as a tracking correction signal, a low frequency component of the tracking driving signal to an optical axis shifting amount estimation circuit 14. The optical axis shifting amount estimation circuit 14 has a dynamic characteristic which is equal to a dynamic characteristic of the objective lens 5, which operates in accordance with the output from the tracking actuator 6. Based on the tracking correction signal output from the tracking control circuit 13, the optical axis shifting amount estimation circuit 14 generates a signal representing an optical axis shifting estimation value, which indicates a displacement substantially equal to a displacement caused by the lens optical axis shifting of the objective lens 5 driven by the tracking actuator 6. Then, the optical axis shifting amount estimation circuit 14 outputs the generated signal to the multiplication circuit 15.

The multiplication circuit 15 multiplies the compensation gain determined by the compensation gain determination circuit 4 with the signal representing the optical axis shifting estimation value generated by the optical axis shifting amount estimation circuit 14. Then, the multiplication circuit 15 outputs the resultant signal representing a DC offset estimation amount to the switching circuit SW1. The switching circuit SW1 is turned on or off in response to an instruction from the system controller 17. When the switching circuit SW1 is turned on, the switching circuit SW1 supplies the signal representing the DC offset estimation amount, output from the multiplication circuit 15, to the offset subtraction circuit 12.

With reference to FIGS. 19 and 20, a conventional method for measuring a DC offset will be described. FIG. 19 illustrates a principle of conventional offset measuring method, and FIG. 20 is a flowchart illustrating the principle of the conventional offset measuring method. In FIG. 19, the disc 31 facing the optical pickup 1 placed on the transportation table 2 in each of steps 91, 93 and 95 is not shown, but the optical pickup 1 actually faces the disc 31.

It is assumed that the switching circuit SW2 selects the lens shift driving signal output from the lens shift driving circuit 18, and the lens shift driving signal is input to the tracking driving circuit 16.

The optical pickup 1 having the objective lens 5 is placed on a neutral position of the transportation table 2. The optical pickup 1 having the objective lens 5 is moved by distance X1 with respect to the transportation table 2 in one radial direction of the disc 31 (for example, toward an outer periphery of the disc 31) by the tracking actuator 6, the tracking actuator 6 receiving the driving signal from the tracking driving circuit 16 in accordance with the lens shift driving signal. The optical beam, directed by the optical pickup 1 which has moved by distance X1 in the one radial direction and reflected by the information layer 33, is converted into a tracking signal by the photodetector 10 provided in the optical pickup 1. The tracking error detection circuit 11 detects a tracking error signal from the tracking signal converted by the photodetector 10. The offset measuring circuit 3 measures a DC offset based on the tracking error signal detected by the tracking error detection circuit 11 (step 91).

Next, the optical pickup 1 having the objective lens 5 is driven by the tracking actuator 6 so as to move by distance 2×X1 in the other radiation direction (for example, toward an inner periphery of the disc 31). The optical pickup 1 is moved from the position which is away from the neutral position by distance X1 in the one radial direction, to the position which is away from the neutral position by distance X1 in the other radial direction. The DC offset is measured in the above-mentioned manner based on an optical beam directed by the optical pickup 1 which has moved by 2×distance X1 in the other radial direction and reflected by the information layer 33 (step 93). Then, the optical pickup 1 having the objective lens 5 is moved to the neutral position (step 95). As described above, the two positions of the optical pickup 1 on the transportation table 2 for measuring the DC offset are symmetrical with respect to the neutral position.

With reference to FIGS. 21A through 21C and 22, a method for determining a compensation gain based on the measured DC offset will be described. FIG. 21A is a graph illustrating the relationship between the lens shift driving signal and time according to the conventional method. FIG. 21B is a graph illustrating the relationship between the position of the objective lens 5 and time according to the conventional method. FIG. 21C is a graph illustrating the relationship between the tracking error signal and time according to the conventional method. FIG. 22 is a flowchart illustrating a procedure of the conventional offset measuring method. Identical elements to those of the flowchart previously discussed with respect to FIG. 20 bear identical reference numerals and the detailed descriptions thereof will be omitted.

The optical beam directed by the optical pickup 1 is positioned on the track provided on the information layer 33 of the disc 31. The photodetector 10 is assumed to be in a state capable of receiving the optical beam reflected by the information layer 33 and converting the optical beam to a tracking signal.

First, as shown in FIG. 21A, in response to an instruction from the system controller 17, the lens shift driving circuit 18 outputs a lens shift driving signal, for moving the objective lens 5 provided in the optical pickup 1 by distance X1 at a constant speed in one radial direction, to the tracking driving circuit 16 via the switching circuit SW2. Based on the lens shift driving signal output from the lens shift driving circuit 18, the tracking driving circuit 16 outputs a driving current for driving the tracking actuator 6. As shown in FIG. 21B, in accordance with the driving current output from the tracking driving circuit 16, the tracking actuator 6 moves the objective lens 5 by distance X1 in the one radial direction from the neutral position on the transportation table 2 at a constant speed (step 91).

When the objective lens 5 is moved by distance X1 from the neutral position on the transportation table 2 in the one radial direction as described above, a DC offset OS11 caused by a lens optical axis shifting is superimposed on the tracking error signal detected by the tracking error detection circuit 11 as shown in FIG. 21C. The offset measuring circuit 3 measures a maximum value and a minimum value of the tracking error signal detected by the tracking error detection circuit 11 and obtains the DC offset OS11 based on the measured maximum and minimum values (step 92).

Next, as shown in FIG. 21A, the lens shift driving circuit 18 outputs a lens shift driving signal, for moving the objective lens 5 by distance 2×distance X1 at a constant speed in the other radial direction, to the tracking driving circuit 16 via the switching circuit SW2. Based on the lens shift driving signal, the tracking driving circuit 16 outputs a driving current for driving the tracking actuator 6. In accordance with the driving current output from the tracking driving circuit 16, as shown in FIG. 21B, the tracking actuator 6 moves the objective lens 5 in the other radial direction at a constant speed, to a position away from the neutral position on the transportation table 2 by distance X1 in the other radial direction (step 93).

When the objective lens 5 is moved to the position away from the neutral position on the transportation table 2 by distance X1 in the other radial direction as described above, a DC offset OS12 having an opposite characteristic to that of the DC offset OS11 is superimposed on the tracking error signal detected by the tracking error detection circuit 11 as shown in FIG. 21C. The offset measuring circuit 3 measures a maximum value and a minimum value of the tracking error signal detected by the tracking error detection circuit 11 and obtains the DC offset OS12 based on the measured maximum and minimum values (step 94).

Then, as shown in FIG. 21A, the lens shift driving circuit 18 outputs a lens shift driving signal, for moving the objective lens 5 in the one radial direction at a constant speed to the initial position before step 91 was performed, to the tracking driving circuit 16 via the switching circuit SW2. Based on the lens shift driving signal, the tracking driving circuit 16 outputs a driving current for driving the tracking actuator 6. In accordance with the driving current output from the tracking driving circuit 16, as shown in FIG. 21B, the tracking actuator 6 moves the objective lens 5 to the initial position (step 95).

The compensation gain determination circuit 4 determines a compensation gain based on the DC offset OS11 measured in step 92, the DC offset OS12 measured in step 94, the distance 2×X1 (=X1+X1) by which the objective lens 5 was moved in step 93, and expression (1) shown below (step 96).

Compensation gain={$OS11+OS12$}/{$X1+X1$}   expression (1)

Then, in response to an instruction from the system controller 17, the switching circuit SW2 selects the tracking driving signal output from the tracking control circuit 13, and outputs the tracking driving signal to the tracking driving circuit 16. Based on the tracking driving signal, the tracking driving circuit 16 outputs a driving current for driving the tracking actuator 6. In accordance with the driving current output from the tracking driving circuit 16, the tracking actuator 6 drives the objective lens 5. As a result, the optical beam converged by the objective lens 5 and directed to the information layer 33 of the disc 31 is positioned in the vicinity of the center of the track provided on the information layer 33.

Next, by an instruction from the system controller 17, the switching circuit SW1 is turned on, and the signal representing the DC offset estimation amount, which is output from the multiplication circuit 15, is input to the offset subtraction circuit 12. The offset subtraction circuit 12 subtracts the signal representing the DC offset estimation amount from the tracking error signal, and outputs the resultant compensated tracking signal to the tracking control circuit 13. As a result, the control target value in tracking control becomes a corrected value which is obtained by subtracting the DC offset superimposed on the tracking error signal. Therefore, the optical beam converged by the objective lens 5 and directed to the information layer 33 is positioned on the substantial center of the track provided on the information layer 33.

Thus, even when the lens optical axis shifting occurs to the objective lens 5 for some reason and as a result, a DC offset is superimposed on the tracking error signal, the optical beam converged by the objective lens 5 and directed to the information layer 33 of the disc 31 can be positioned to the substantial center of the track provided on the information layer 33, as long as the switching circuit SW1 is closed. Therefore, recording of an information signal on, or reproduction of an information signal from the information layer 33, can be stably performed.

However, the above-described conventional method for measuring the DC offset has the following problem. As shown in FIG. 19, the position on the information layer 33 to which the optical beam is directed after being emitted from the optical pickup 1, for the purpose of measuring a DC offset for the first time in step 91, is different from the position on the information layer 33 to which the optical beam is directed after being emitted from the optical pickup 1 for the purpose of measuring a DC offset for the second time in step 93. Therefore, when the information layer 33 has different reflection characteristics or different transmission characteristics at these two different positions, the DC offset may not be measured with high precision.

For example, when the information layer 33 has dirt, dust or an unrecoverable defect (hereinafter, referred to as a "defect") at either one of the position on the information layer 33 to which the optical beam is directed after being emitted from the optical pickup 1 for the purpose of measuring a DC offset for the first time in step 91, or the position on the information layer 33 to which the optical beam is directed after being emitted from the optical pickup 1 for the purpose of measuring a DC offset for the second time in step 93, the optical beam reflected at the position having the defect is fluctuated by the influence of the defect as well as by the influence of the lens optical axis shifting. Therefore, signals other than a DC offset signal, generated by the influence of the lens axis shifting, are superimposed on the tracking error signal detected by the tracking error detection circuit 11. As a result, the DC offset cannot be measured with high precision.

There is another problem as follows when a plurality of different types of discs are exchangeably used for a common recording and reproduction apparatus. Until the information recorded on the disc mounted on the recording and reproduction apparatus is reproduced, it cannot be determined whether or not the area of the disc to be used for information recording or reproduction is an area where the DC offset should be compensated for by a signal representing a DC offset estimation amount.

The present invention for solving these problems has an objective of providing an offset measuring method and a recording and reproduction apparatus for measuring, with high precision, a DC offset superimposed on a tracking error signal caused by lens optical axis shifting.

Another objective of the present invention is to provide an offset measuring method and a recording and reproduction apparatus for determining an area on a disc where a DC offset superimposed on a tracking error signal should be compensated for by a signal representing a DC offset estimation amount.

DISCLOSURE OF THE INVENTION

An offset measuring method, according to the present invention, for measuring an offset superimposed on a tracking error signal based on an optical beam reflected by an information medium, in a recording and reproduction apparatus including an optical pickup placed on transportation means so as to be driven along a radial direction of the information medium, includes a first offset amount measuring step of directing an optical beam toward a first measuring position on the information medium from the optical pickup, thereby measuring a first offset amount based on the optical beam reflected at the first measuring position; a transportation means moving step of, after the first offset amount measuring step, moving the transportation means having the optical pickup placed thereon by a first distance in a first direction along the radial direction; a first optical pickup driving step of driving the optical pickup on the transportation means by a second distance, which is substantially equal to the first distance, in a second direction which is opposite to the first direction; and a second offset amount measuring step of, after the transportation means moving step and the first optical pickup driving step, directing an optical beam toward a second measuring position on the information medium from the optical pickup, thereby measuring a second offset amount based on the optical beam reflected at the second measuring position. Thus, the above-described objectives are achieved.

The transportation means moving step maybe performed before the first optical pickup driving step.

The offset measuring method may further include a second optical pickup driving step of, before the first offset amount measuring step, driving the optical pickup on the transportation means by a third distance in a third direction along the radial direction.

The third direction may be identical to the first direction.

The third direction may be opposite to the first direction.

The second optical pickup driving step may drive the optical pickup by the third distance from a neutral position on the transportation means.

The information medium may have a groove formed therein, to which the optical beam is to be directed, the optical beam may have a wavelength of $\lambda$, and the groove may have a depth of equal to or more than $\lambda/8$ and equal to or less than $\lambda/6$.

An information signal may be recorded on the information medium by light-heat conversion.

The offset measuring method may further include a compensation gain determination step of determining a compensation gain which represents an offset characteristic of the optical pickup with respect to the transportation means, based on the first offset amount measured by the first offset amount measuring step and the second offset amount measured by the second offset amount measuring step.

The offset measuring method may further include a step of compensating for the offset of the optical pickup with respect to the transportation means, in accordance with a value of the compensation gain determined by the compensation gain determination step.

The offset measuring method may further include a first tracking error signal detection step of directing an optical beam toward a third measuring position on the information medium along the radial direction from the optical pickup, thereby detecting a first tracking error signal by a push-pull system based on the optical beam reflected at the third measuring position; a second tracking error signal detection step of detecting a second tracking error signal by a phase difference system based on the optical beam reflected at the third measuring position; and a step of determining whether or not to compensate for the offset of the optical pickup with respect to the transportation means, based on the first tracking error signal detected by the first tracking error signal detection step and the second tracking error signal detected by the second tracking error signal detection step.

A recording and reproduction apparatus according to the present invention includes an optical pickup placed on transportation means so as to be driven along a radial direction of an information medium; offset amount measuring means for measuring a first offset amount based on an optical beam directed toward a first measuring position on the information medium from the optical pickup and reflected at the first measuring position; control means for, after the offset amount measuring means measures the first offset amount, moving the transportation means having the optical pickup placed thereon by a first distance in a first direction along the radial direction: and driving means for, after the offset amount measuring means measures the first offset amount, driving the optical pickup on the transportation means by a second distance, which is substantially equal to the first distance, in a second direction, which is opposite to the first direction. The offset amount measuring means measures a second offset amount based on an optical beam, which is directed to a second measuring position on the information medium from the optical pickup after the control means moves the transportation means by the first distance in the first direction and further after the driving means drives the optical pickup by the second distance in the second direction, and then is reflected at the second measuring position. Thus, the above-described objectives are achieved.

BRIEF DESCRIPTION OF THE DRAWINGS

FIG. 1 shows a recording and reproduction apparatus according to a first example.

FIG. 2 illustrates a principle of an offset measuring method according to the first example.

FIG. 3 is a flowchart illustrating the principle of the offset measuring method according to the first example.

FIG. 4A is a graph illustrating the lens shift driving signal and time according to the first example.

FIG. 4B is a graph illustrating the position of the objective lens and time according to the first example.

FIG. 4C is a graph illustrating the tracking error signal and time according to the first example.

FIG. 5 is a flowchart illustrating a procedure of the offset measuring method according to the first example.

FIG. 7A illustrates a principle of still another offset measuring method according to the first example.

FIG. 12 shows a recording and reproduction apparatus according to a third example.

FIG. 22 is a flowchart illustrating a procedure of the conventional offset measuring method.

BEST MODE FOR CARRYING OUT THE INVENTION

Figure 6A:
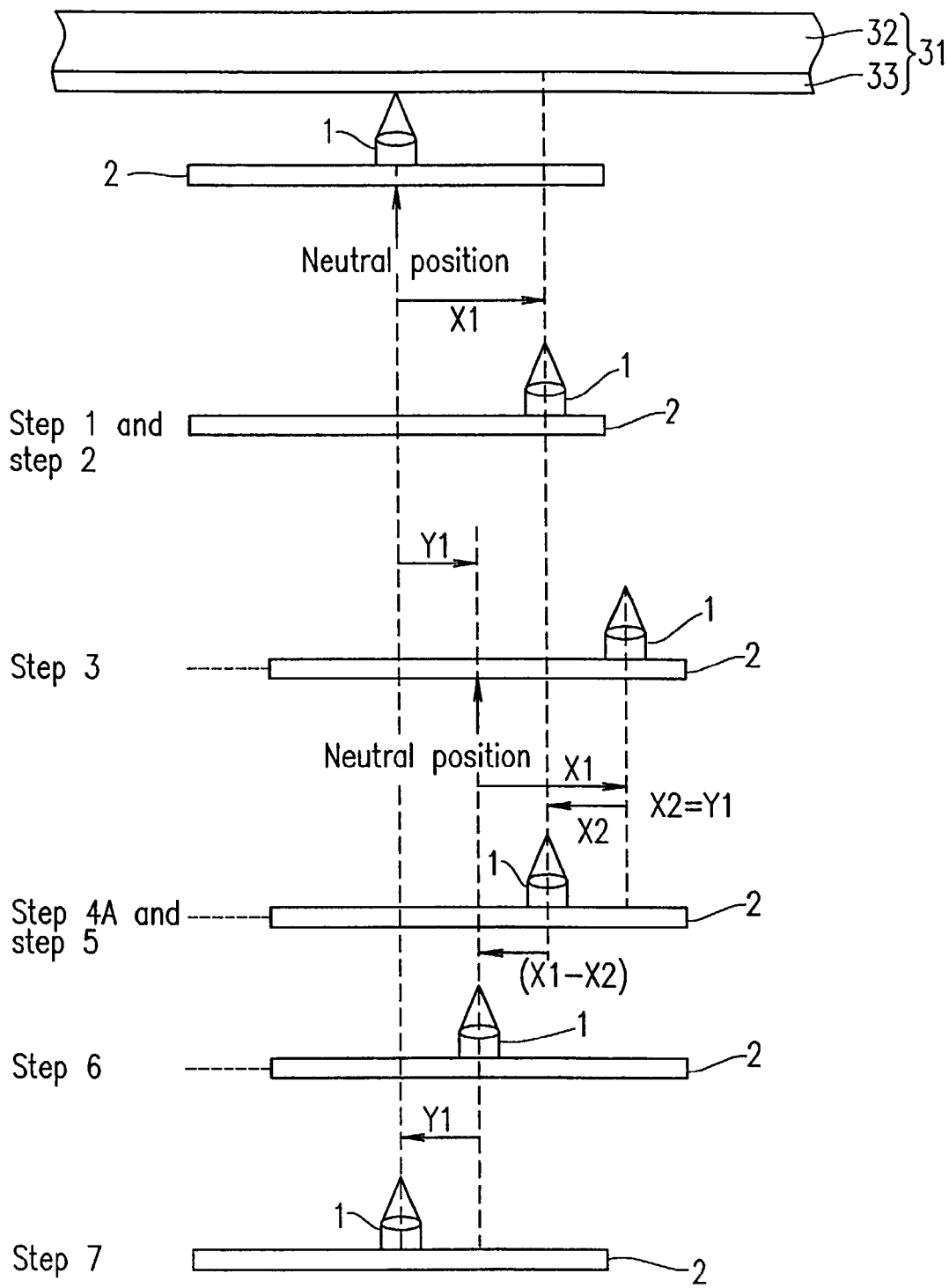
FIG. 6A illustrates a principle of another offset measuring method according to the first example.

A recording and reproduction apparatus according to the present invention measures a DC offset superimposed on a tracking error signal detected from an optical beam reflected by a disc.

EXAMPLE 1

FIG. 1 shows a structure of a recording and reproduction apparatus 50 according to a first example. A disc 31, on which the recording and reproduction apparatus 50 records information, or from which the recording and reproduction apparatus 50 reproduces information, includes a substrate 32. An information layer 33 used for information recording and reproduction is formed on the substrate 32. Information is recorded on the information layer 33 by light-heat conversion. The recording and reproduction apparatus 50 includes an optical pickup 1 provided so as to face the information layer 33 formed in the disc 31.

The optical pickup 1 is placed on a transportation table 2. The transportation table 2 having the optical pickup 1 placed thereon transports the optical pickup 1 along a radial direction of the information medium 31 based on an instruction from a system controller 17. In this manner, the optical pickup 1 is transported by the transportation table 2 and thus moved to an arbitrary position along the radial direction of the information medium 31, where the optical pickup 1 can direct an optical beam toward the information layer 33 so as to record information on, or reproduce information from the information layer 33.

The optical pickup 1 has a light source 7. The light source 7 is formed of a red semiconductor laser device. The light source 7 oscillates an optical beam having a wavelength of 650 nanometers (nm) and emits the optical beam toward a collimator lens 8. The optical beam emitted from the light source 7 (hereinafter, referred also to as "emitted light") is converted into a collimated beam by the collimator lens 8, passes through a beam splitter 9, is converged by an objective lens 5, and is directed to the information layer 33 of the disc 31.

The optical beam reflected by the information layer 33 passes through the objective lens 5 and the beam splitter 9 and is incident on a photodetector 10 having two light receiving sections. The photodetector 10 outputs, as a tracking signal, a difference in the light intensity between the optical beams respectively received by the two light receiving sections to a tracking error detection circuit 11.

The optical pickup 1 includes a tracking actuator 6. Based on a driving current from a tracking driving circuit 16, the tracking actuator 6 moves the objective lens 5 with respect to the transportation table 2 along the radial direction of the information medium 31.

The tracking error detection circuit 11 detects a tracking error signal, on which a DC offset is superimposed, by the above-described push-pull system from the tracking signal output from the photodetector 10, and outputs the tracking error signal to an offset measuring circuit 3 and an offset subtraction circuit 12. The offset subtraction circuit 12 subtracts a signal representing a DC offset estimation amount from the tracking error signal detected by the tracking error detection circuit 11, and outputs the resultant compensated tracking error signal to a tracking control circuit 13. The signal representing the DC offset estimation amount will be described later in detail.

Based on the compensated tracking error signal output from the offset subtraction circuit 12, the tracking control circuit 13 generates a tracking driving signal for performing phase compensation such that the position of the optical beam collected onto the information layer 33 tracks a control target position representing the central position of the track formed on the information layer 33. Then, the tracking control circuit 13 outputs the tracking driving signal to a switching circuit SW2.

In response to an instruction from the system controller 17, the switching circuit SW2 selects either a tracking driving signal output from the tracking control circuit 13 or a lens shift driving signal output from a lens shift driving circuit 18, and outputs the selected signal to the tracking driving circuit 16. For causing the position of the optical beam collected onto the information layer 33 to track the control target position representing the central position of the track formed on the information layer 33 by tracking control, the switching circuit SW2 selects the tracking driving signal output from the tracking control circuit 13, and outputs the tracking driving signal to the tracking driving circuit 16. For measuring a DC offset for determining the compensation gain, or for transporting the optical pickup 1 to an arbitrary position along the radial direction of the information medium 31 by the transportation table 2. the switching circuit SW2 selects the lens shift driving signal output from the lens shift driving circuit 18, and outputs the lens shift driving signal to the tracking driving circuit 16.

In accordance with the tracking driving signal or the lens shift driving signal output from the switching circuit SW2, the tracking driving circuit 16 outputs a driving current, for moving the objective lens 5, to the tracking actuator 6. Based on the driving current from the tracking driving circuit 16, the tracking actuator 6 moves the objective lens 5 with respect to the transportation table 2 along the radial direction of the information medium 31.

The offset measuring circuit 3 detects a maximum value and a minimum value of the tracking error signal detected by the tracking error detection circuit 11. The offset measuring circuit 3 calculates the difference between the detected maximum and minimum values so as to measure the DC offset superimposed on the tracking error signal. Then, the offset measuring circuit 3 outputs the DC offset to a compensation gain determination circuit 4. Based on the DC offset measured by the offset measuring circuit 3, the compensation gain determination circuit 4 determines the compensation gain and outputs the compensation gain to a multiplication circuit 15.

The tracking control circuit 13 outputs, as a tracking correction signal, a low frequency component of the tracking driving signal to an optical axis shifting amount estimation circuit 14. The optical axis shifting amount estimation circuit 14 has a dynamic characteristic which is equal to a dynamic characteristic of the objective lens 5, which operates in accordance with the output from the tracking actuator 6. Based on the tracking correction signal output from the tracking control circuit 13, the optical axis shifting amount estimation circuit 14 generates a signal representing an optical axis shifting estimation value, which indicates a displacement substantially equal to a displacement caused by the lens optical axis shifting of the objective lens 5 driven by the tracking actuator 6. Then, the optical axis shifting amount estimation circuit 14 outputs the generated signal to the multiplication circuit 15.

The multiplication circuit 15 multiplies the compensation gain determined by the compensation gain determination circuit 4 with the signal representing the optical axis shifting estimation value generated by the optical axis shifting amount estimation circuit 14. Then, the multiplication circuit 15 outputs the resultant signal representing a DC offset estimation amount to the switching circuit SW1. The switching circuit SW1 is turned on or off in response to an instruction from the system controller 17. When the switching circuit SW1 is turned on, the switching circuit SW1 supplies the signal representing the DC offset estimation amount, output from the multiplication circuit 15, to the offset subtraction circuit 12.

With reference to FIGS. 2 and 3, a method by which the recording and reproduction apparatus 50 having the above-described structure according to the first example measures a DC offset will be described. FIG. 2 illustrates a principle of an offset measuring method according to the first example, and FIG. 3 is a flowchart illustrating the principle of the offset measuring method according to the first example. In FIG. 2, the disc 31 facing the optical pickup 1 placed on the transportation table 2 in each of steps 1 through 7 is not shown, but the optical pickup 1 actually faces the disc 31. It is assumed that the switching circuit SW2 selects the lens shift driving signal output from the lens shift driving circuit 18, and the lens shift driving signal is input to the tracking driving circuit 16.

The optical pickup 1 having the objective lens 5 (FIG. 1) is placed on a neutral position of the transportation table 2. The optical pickup 1 having the objective lens 5 is moved by distance X1 with respect to the transportation table 2 in one radial direction of the disc 31 (for example, toward an outer periphery of the disc 31) by the tracking actuator 6, the tracking actuator 6 receiving the driving signal from the tracking driving circuit 16 in accordance with the lens shift driving signal (step 1).

The optical pickup 1, which has moved by distance X1 in the one radial direction, directs an optical beam toward a first measuring position along the radial direction of the information layer 33. The photodetector 10 (FIG. 1) provided in the optical pickup 1 converts the optical beam reflected at the first measuring position on the information layer 33 into a tracking signal. The tracking error detection circuit 11 detects a tracking error signal from the tracking signal converted by the photodetector 10. The offset measuring circuit 3 measures a DC offset based on the tracking error signal detected by the tracking error detection circuit 11 (step 2).

Next, the transportation table 2 having the optical pickup 1 placed thereon is moved in the one radial direction of the disc 31 by distance Y1 (step 3). Distance Y1 is set to be longer than distance X1, by which the optical pickup 1 moved on the transportation table 2 in step 1.

Then, the optical pickup 1 having the objective lens 5 is driven by the tracking actuator 6 so as to move on the transportation table 2 by distance (X1+X2) in the other direction. The optical pickup 1 is moved from the position which is away from the neutral position on the transportation table 2 by distance X1 in the one radial direction, to the position which is away from the neutral position by distance X2 in the other radial direction (for example, toward an inner periphery of the disc 31) (step 4).

The optical pickup 1, which has moved on the transportation table 2 by distance (X1+X2) in the other radial direction, directs an optical beam toward a second measuring position along the radial direction of the information layer 33. Next, based on the optical beam reflected at the second measuring position on the information layer 33, a DC offset OS2 is measured in the manner described in step 2 (step 5).

Distance Y1, by which the transportation table 2 having the optical pickup 1 placed thereon moves in the one radial direction in step 3, is set to be equal to distance (X1+X2), by which the optical pickup 1 moves on the transportation table 2 in the other radial direction in step 4. Accordingly, the first measuring position along the radial direction of the information layer 33, to which the optical beam emitted by the optical pickup 1 is directed in step 2 for measuring the DC offset, is substantially the same as the second measuring position along the radial direction of the information layer 33, to which the optical beam emitted by the optical pickup 1 is directed in step 5.

Therefore, the reflection characteristic or the transmission characteristic of the information layer 33 used for the first measurement of the DC offset in a position of step 2 is substantially the same as the reflection characteristic or the transmission characteristic of the information layer 33 used for the second measurement of the DC offset in a position of step 5. As a result, the above-described problem does not occur that the information layer 33 has different reflection characteristics or different transmission characteristics at two different positions to which the optical beam is directed. Thus, the DC offset superimposed on the tracking error signal due to the lens optical axis shifting can be measured with high precision.

Then, the optical pickup 1 is moved with respect to the transportation table 2 by distance X2 in the one radial direction up to the neutral position on the transportation table 2 (step 6). The transportation table 2 having the optical pickup 1 placed thereon, which has moved to the neutral position on the transportation table 2, is moved by distance Y1 in the other radial direction of the disc 31. Thus, the optical pickup 1 and the transportation table 2 are moved back to the initial position (step 7).

With reference to FIGS. 4A through 4C and 5, a method for determining a compensation gain based on the measured DC offset will be described. FIG. 4A is a graph illustrating the relationship between the lens shift driving signal and time according to the first example. FIG. 4B is a graph illustrating the relationship between the position of the optical pickup 1 and time according to the first example. FIG. 4C is a graph illustrating the relationship between the tracking error signal and time according to the first example. FIG. 5 is a flowchart illustrating a procedure of the method for determining a compensation gain based on the measured DC offset according to the first example. Identical elements to those of the flowchart for illustrating the principle of the offset measuring method previously discussed with respect to FIG. 3 bear identical reference numerals and the detailed descriptions thereof will be omitted. The optical beam directed by the optical pickup 1 is positioned on the track provided on the information layer 33 of the disc 31. The photodetector 10 provided in the optical pickup 1 is assumed to be in a state capable of receiving the optical beam reflected by the information layer 33 and converting the optical beam to a tracking signal.

First, as shown in FIG. 4A, in response to an instruction from the system controller 17, the lens shift driving circuit 18 outputs a lens shift driving signal, for moving the objective lens 5 provided in the optical pickup 1 by distance X1 at a constant speed in one radial direction, to the tracking driving circuit 16 via the switching circuit SW2. Based on the lens shift driving signal output from the lens shift driving circuit 18, the tracking driving circuit 16 outputs a driving current for driving the tracking actuator 6. As shown in FIGS. 2 and 4B, in accordance with the driving current output from the tracking driving circuit 16, the tracking actuator 6 moves the optical pickup 1 having the objective lens 5 with respect to the transportation table 2 by distance X1 in the one radial direction from the neutral position on the transportation table 2 at a constant speed (step 1).

The optical pickup 1, which has moved by distance X1 in the one radial direction from the neutral position on the transportation table 2, directs an optical beam toward a first measuring position along the radial direction of the information layer 33. The photodetector 10 provided in the optical pickup 1 converts the optical beam reflected at the first measuring position into a tracking signal. The tracking error detection circuit 11 detects a tracking error signal from the tracking signal. On the tracking error signal detected by the tracking error detection circuit 11, a DC offset OS1 is superimposed due to the lens optical axis shifting as shown in FIG. 4C. The offset measuring circuit 3 measures a maximum value and a minimum value of the tracking error signal detected by the tracking error detection circuit 11 and obtains the DC offset OS1 based on the measured maximum and minimum values (step 2).

Next, distance X1, by which the optical pickup 1 moved on the transportation table 2 in step 1, and the DC offset OS1, measured by the offset measuring circuit 3 in step 2, are stored in a memory circuit (not shown) provided in the compensation gain determination circuit 4 (step 2-1).

Then, the transportation table 2 having the optical pickup 1 placed thereon is moved in the one radial direction of the disc 31 by distance Y1, which is longer than distance X1 (step 3). As shown in FIGS. 2 and 4B, the optical pickup 1 having the objective lens 5 is driven by the tracking actuator 6 so as to move on the transportation table 2 by distance (X1+X2) in the other radial direction. The optical pickup 1 is moved from the position which is away from the neutral position on the transportation table 2 by distance X1 in the one radial direction, to the position which is away from the neutral position by distance X2 in the other radial direction (step 4).

The optical pickup 1, which has moved on the transportation table 2 by distance (X1+X2) in the other radial direction, directs an optical beam toward a second measuring position, which is substantially the same as the first measuring position on the information layer 33. Next, based on the optical beam reflected at the second measuring position on the information layer 33, the DC offset OS2 is measured in the manner described in step 2 (step 5).

Next, distance X2 obtained by subtracting distance X1 from distance (X1+X2), by which the optical pickup 1 moved on the transportation table 2 in step 4, and the DC offset OS2, measured by the offset measuring circuit 3 in step 5, are stored in the memory circuit (not shown) provided in the compensation gain determination circuit 4 (step 5-1).

Then, the optical pickup 1 having the objective lens 5 is moved in the one radial direction by distance X2 up to the neutral position on the transportation table 2 (step 6). The transportation table 2 having the optical pickup 1, which has moved to the neutral position on the transportation table 2, is moved in the other radial direction of the disc 31 by distance Y1. Thus, the optical pickup 1 and the transportation table 2 are moved back to the initial position (step 7).

The compensation gain determination circuit 4 determines a compensation gain based on moving distance X1 of the optical pickup 1 and the DC offset OS1, which were stored in the memory circuit (not shown) in step 2-1, moving distance X2 of the optical pickup 1 and the DC offset OS2, which were stored in the memory circuit (not shown) in step 5-1, and expression (2) shown below (step 8).

Compensation gain=$\{OS1+OS2\}/\{X1+X2\}$      expression (2)

As described above, the offset measuring method according to the present invention includes: a first offset amount measuring step (step 2) of directing an optical beam toward a first measuring position along a radial direction of the information medium 31 from the optical pickup 1 which is placed on the transportation table 2 so as to be drivable along the radial direction of the disc 31, thereby measuring a DC offset OS1 based on the optical beam reflected at the first measuring position; a transportation means moving step (step 3) of, after the first offset amount measuring step, moving the transportation table 2 having the optical pickup 1 placed thereon by distance Y1 in one radial direction; a first optical pickup driving step (step 4) of, after the first offset amount measuring step, driving the optical pickup 1 by distance (X1+X2) on the transportation table 2 in the other radial direction; and a second offset amount measuring step (step 5-1) of, after the transportation means moving step (step 3) and the first optical pickup driving step (step 4), directing an optical beam to a second measuring position along the radial direction of the disc 31 from the optical pickup 1, thereby measuring a DC offset OS2 based on the optical beam reflected at the second measuring position. Distance (X1+X2) is substantially equal to distance Y1.

Therefore, the second measuring position to which the optical beam is directed in step 5 is substantially the same as the first measuring position to which the optical beam is directed in step 2. Accordingly, the reflection characteristic or the transmission characteristic of the information layer 33, to which the optical beam is directed in a first DC offset measurement in a position of step 2, is substantially the same as the reflection characteristic or the transmission characteristic of the information layer 33, to which the optical beam is directed in a second DC offset measurement in a position of step 5. As a result, the above-described problem does not occur that the information layer 33 has different reflection characteristics or different transmission characteristics at two different positions to which the optical beam is directed. Thus, the DC offset superimposed on the tracking error signal due to the lens optical axis shifting can be measured with high precision.

In the first example, distance (X1+X2) is substantially equal to distance Y1. The present invention is not limited to this. Distance (X1+X2) may be slightly different from distance Y1 to the extent that the second measuring position is close to the first measuring position. The reason will be described below. When the second measuring position at which the DC offset is to be measured for the second time in step 5 is close to the first measuring position at which the DC offset was measured for the first time in step 2, the difference between the reflection characteristics or the transmission characteristics of the information layer 33 used for the first and second DC offset measurements is significantly smaller than that of the conventional art, in which the second measuring position is far from the first measuring position. Therefore, the DC offset superimposed on the tracking error signal due to the lens optical axis shifting can be measured with significantly higher precision as compared to the conventional art.

In the first example, the transportation means moving step (step 3) is performed before the first optical pickup driving step (step 4). The present invention is not limited to this. The transportation means moving step (step 3) may be performed after the first optical pickup driving step (step 4).

It is most preferable that distance (X1+X2) is completely equal to distance Y1, for the following reason. With such setting, the reflection characteristic or the transmission characteristic of the information layer 33 used for the first DC offset measurement in a position of step 2 is completely identical to the reflection characteristic or the transmission characteristic of the information layer 33 used for the second DC offset measurement in a position of step 5. Therefore, the second measuring position to which the optical beam is directed in step 5 is completely identical to the first measuring position to which the optical beam is directed in step 2.

Distance Y1, by which the transportation table 2 moves in step 3, is set to be longer than distance X1, by which the optical pickup 1 moves on the transportation table 2 in step 1. Therefore, the optical pickup 1, which is shifted toward an outer periphery of the disc 31 with respect to the neutral position of the transportation table 2 at the time of the first DC offset measurement in step 2, is shifted toward an inner periphery of the disc 31 with respect to the neutral position of the transportation table 2 at the time of the second DC offset measurement in step 5.

Therefore, the two positions of the optical pickup 1 on the transportation table 2 when the DC offset is measured cover a wider area accommodating the neutral position. Thus, the lens shift characteristic, which represents the DC offset characteristic with respect to the position of the optical pickup 1 on the transportation table 2, can be measured more precisely.

Distance X1 is preferably set to be equal to distance X2 for the following reason. With such setting, the position of the optical pickup 1 on the transportation table 2 at the time of the first DC measurement in step 2, and the position of the optical pickup 1 on the transportation table 2 at the time of the second DC measurement in step 5, are symmetrical with each other with respect to the neutral position on the transportation table 2. Thus, the reliability of the measured lens shift characteristic can be improved.

Figure 6B:
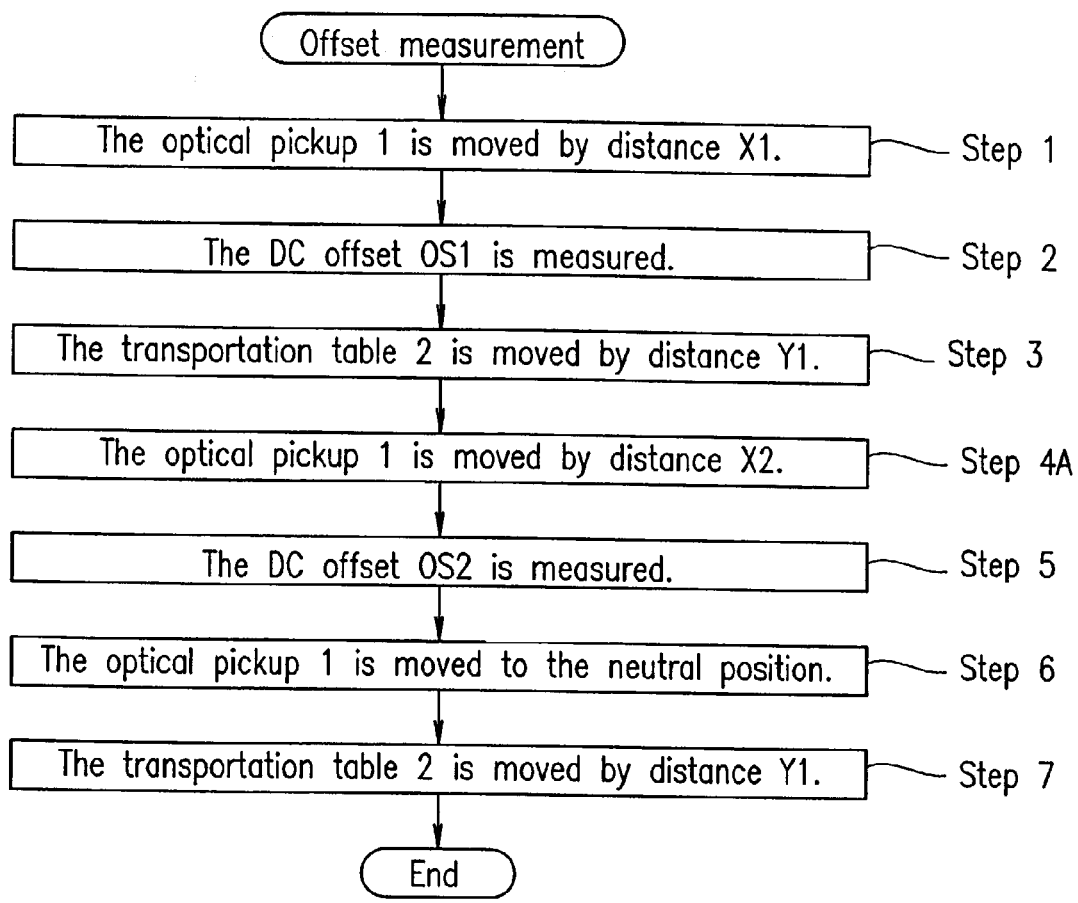
FIG. 6B is a flowchart illustrating the principle of the another offset measuring method according to the first example.

FIG. 6A illustrates a principle of another offset measuring method according to the first example. FIG. 6B is a flowchart illustrating a procedure of the method shown in FIG. 6A. Identical elements to those in the offset measuring method previously discussed with respect to FIGS. 2 and 3 bear identical reference numerals and the detailed descriptions thereof will be omitted. Unlike the offset measuring method described above in the first example, in the offset measuring method shown in FIGS. 6A and 6B, distance Y1 is equal to or less than distance X1 (step 3A) and distance Y1 is substantially equal to distance X2 (step 4A).

With reference to FIGS. 6A and 6B, the optical pickup 1 having the objective lens 5 is placed on the neutral position on the transportation table 2. The optical pickup 1 is moved by the tracking actuator 6 with respect to the transportation table 2 in one radial direction of the disc 31 by distance X1 (step 1).

The optical pickup 1, which has moved by distance X1 in the one radial direction, directs an optical beam toward a first measuring position on the information layer 33. The photodetector 10 provided in the optical pickup 1 converts the optical beam reflected at the first measuring position on the information layer 33 into a tracking signal. The tracking error detection circuit 11 detects a tracking error signal from the tracking signal. The offset measuring circuit 3 measures a DC offset based on the tracking error signal (step 2).

Next, the transportation table 2 having the optical pickup 1 placed thereon is moved in the one radial direction of the disc 31 by distance Y1. Distance Y1 is set to be equal to or less than distance X1, by which the optical pickup 1 moved on the transportation table 2 in step 1 (step 3A).

Then, the optical pickup 1 having the objective lens 5 is driven by the tracking actuator 6 so as to move on the transportation table 2 by distance X2 in the other radial direction, from the position which is away from the neutral position on the transportation table 2 by distance X1 in the one radial direction. Distance X2 is set to be substantially equal to distance Y1, by which the transportation table 2 moved in the one radial direction in step 3A (step 4A).

The optical pickup 1, which has moved on the transportation table 2 by distance X2 in the other radial direction, directs an optical beam toward a second measuring position on the information layer 33. Next, a DC offset OS2 is measured in the manner described in step 2 based on the optical beam reflected at the second measuring position on the information layer 33 (step 5).

Then, the optical pickup 1 is moved with respect to the transportation table 2 in the other radial direction by distance (X1−X2) up to the neutral position on the transportation table 2 (step 6). The transportation table 2 having the optical pickup 1, which has moved to the neutral position on the transportation table 2, is moved in the other radial direction of the disc 31 by distance Y1. Thus, the optical pickup 1 and the transportation table 2 are moved back to the initial position (step 7).

As described above, distance X2, by which the optical pickup 1 moves on the transportation table 2 in the other radial direction in step 4A, is set to be substantially equal to distance Y1, by which the transportation table 2 moves in the one radial direction in step 3A. Accordingly, like the offset measuring method described above with reference to FIG. 2, the first measuring position, along the radial direction of the information layer 33, to which the optical beam emitted by the optical pickup 1 is directed in step 2 for measuring the DC offset is substantially the same as the second measuring position, along the radial direction of the information layer 33, to which the optical beam emitted by the optical pickup 1 is directed in step 5.

Therefore, the reflection characteristic or the transmission characteristic of the information layer 33 used for the first measurement of the DC offset in a position of step 2 is substantially the same as the reflection characteristic or the transmission characteristic of the information layer 33 used for the second measurement of the DC offset in a position of step 5. As a result, the DC offset superimposed on the tracking error signal due to the lens optical axis shifting can be measured with high precision.

Figure 7B:
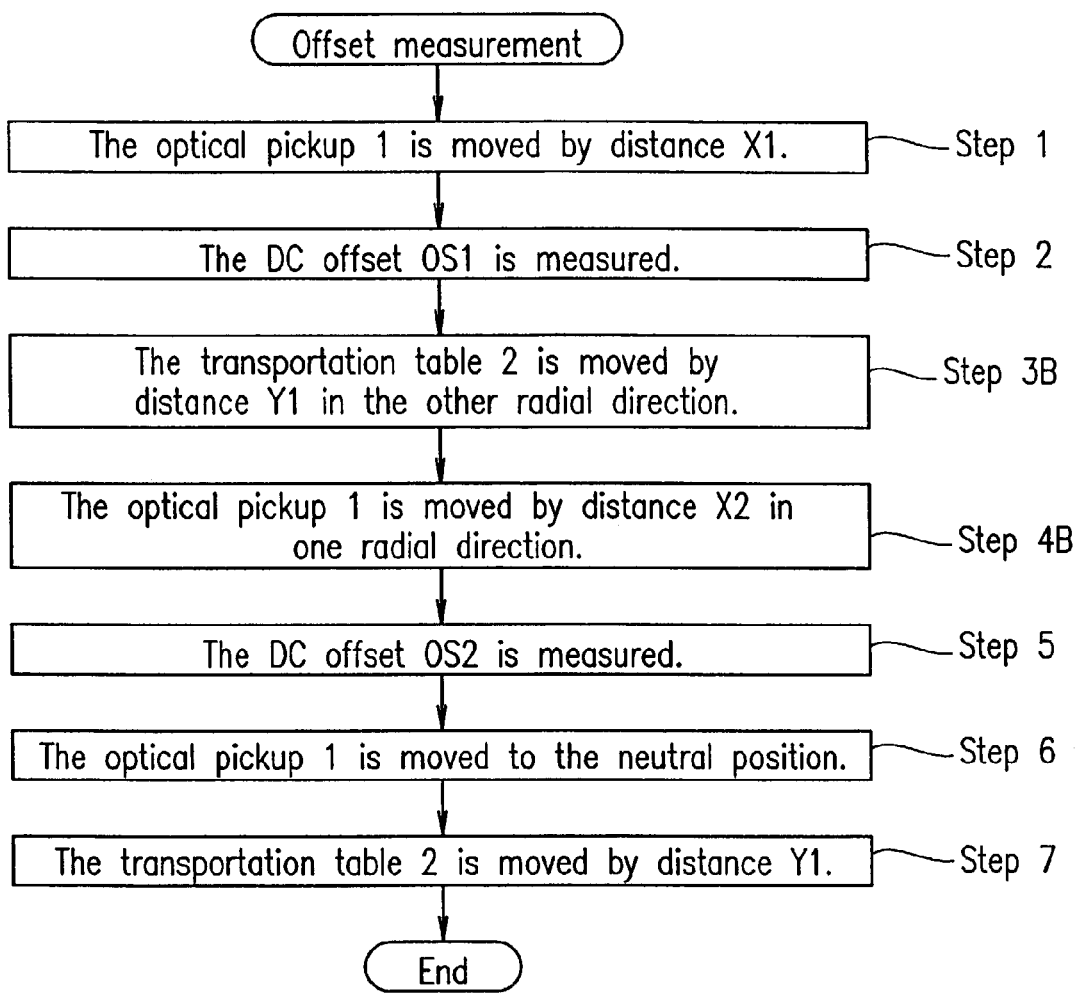
FIG. 7B is a flowchart illustrating the principle of the still another offset measuring method according to the first example.

FIG. 7A illustrates a principle of still another offset measuring method according to the first example. FIG. 7B is a flowchart illustrating a procedure of the method shown in FIG. 7A. Identical elements to those in the offset measuring method previously discussed with respect to FIGS. 2 and 3 bear identical reference numerals and the detailed descriptions thereof will be omitted. Unlike the offset measuring method described above, in the offset measuring method shown in FIGS. 7A and 7B, the transportation table 2 moves by distance Y1 in the other radial direction, which is opposite to the one direction (step 3B) and the optical pickup 1 moves by distance X2 on the transportation table 2 in the one radial direction, which is opposite to the other direction (step 4B).

With reference to FIGS. 7A and 7B, the optical pickup 1 having the objective lens 5 is placed on the neutral position on the transportation table 2. The optical pickup 1 is moved by the tracking actuator 6 with respect to the transportation table 2 in one radial direction of the disc 31 by distance X1 (step 1).

The optical pickup 1, which has moved by distance X1 in the one radial direction, directs an optical beam toward a first measuring position on the information layer 33. The photodetector 10 provided in the optical pickup 1 converts the optical beam reflected at the first measuring position into a tracking signal. The tracking error detection circuit 11 detects a tracking error signal from the tracking signal. The offset measuring circuit 3 measures a DC offset based on the tracking error signal (step 2).

Next, the transportation table 2 having the optical pickup 1 placed thereon is moved in the other radial direction of the disc 31, which is opposite to the one direction, by distance Y1 (step 3B).

Then, the optical pickup 1 having the objective lens 5 is driven by the tracking actuator 6 so as to move on the transportation table 2 by distance X2 in the one radial direction, from the position which is away from the neutral position on the transportation table 2 by distance X1 in the one radiation direction. Distance X2 is set to be substantially equal to distance Y1, by which the transportation table 2 moved in the other radial direction in step 3B (step 4B).

The optical pickup 1, which has moved on the transportation table 2 by distance X2 in the one radial direction in step 4B, directs an optical beam toward a second measuring position on the information layer 33. Next, a DC offset OS2 is measured in the manner described in step 2 based on the optical beam reflected at the second measuring position on the information layer 33 (step 5).

Then, the optical pickup 1 is moved with respect to the transportation table 2 in the other radial direction by distance (X1+X2) up to the neutral position on the transportation table 2 (step 6). The transportation table 2 having the optical pickup 1, which has moved to the neutral position on the transportation table 2, is moved in the one radial direction of the disc 31 by distance Y1. Thus, the optical pickup 1 and the transportation table 2 are moved back to the initial position (step 7).

As described above, distance X2, by which the optical pickup 1 moves on the transportation table 2 in the one radial direction in step 4B, is set to be substantially equal to distance Y1, by which the transportation table 2 moves in the other radial direction in step 3B. Accordingly, like the offset measuring method described above with reference to FIG. 2, the first measuring position, on the information layer 33, to which the optical beam emitted by the optical pickup 1 is directed in step 2 is substantially the same as the second measuring position to which the optical beam emitted by the optical pickup 1 is directed in step 5.

Therefore, the reflection characteristic or the transmission characteristic of the information layer 33 used for the first measurement of the DC offset in a position of step 2 is substantially the same as the reflection characteristic or the transmission characteristic of the information layer 33 used for the second measurement of the DC offset in a position of step 5. As a result, the DC offset superimposed on the tracking error signal due to the lens optical axis shifting can be measured with high precision.

Figure 8A:
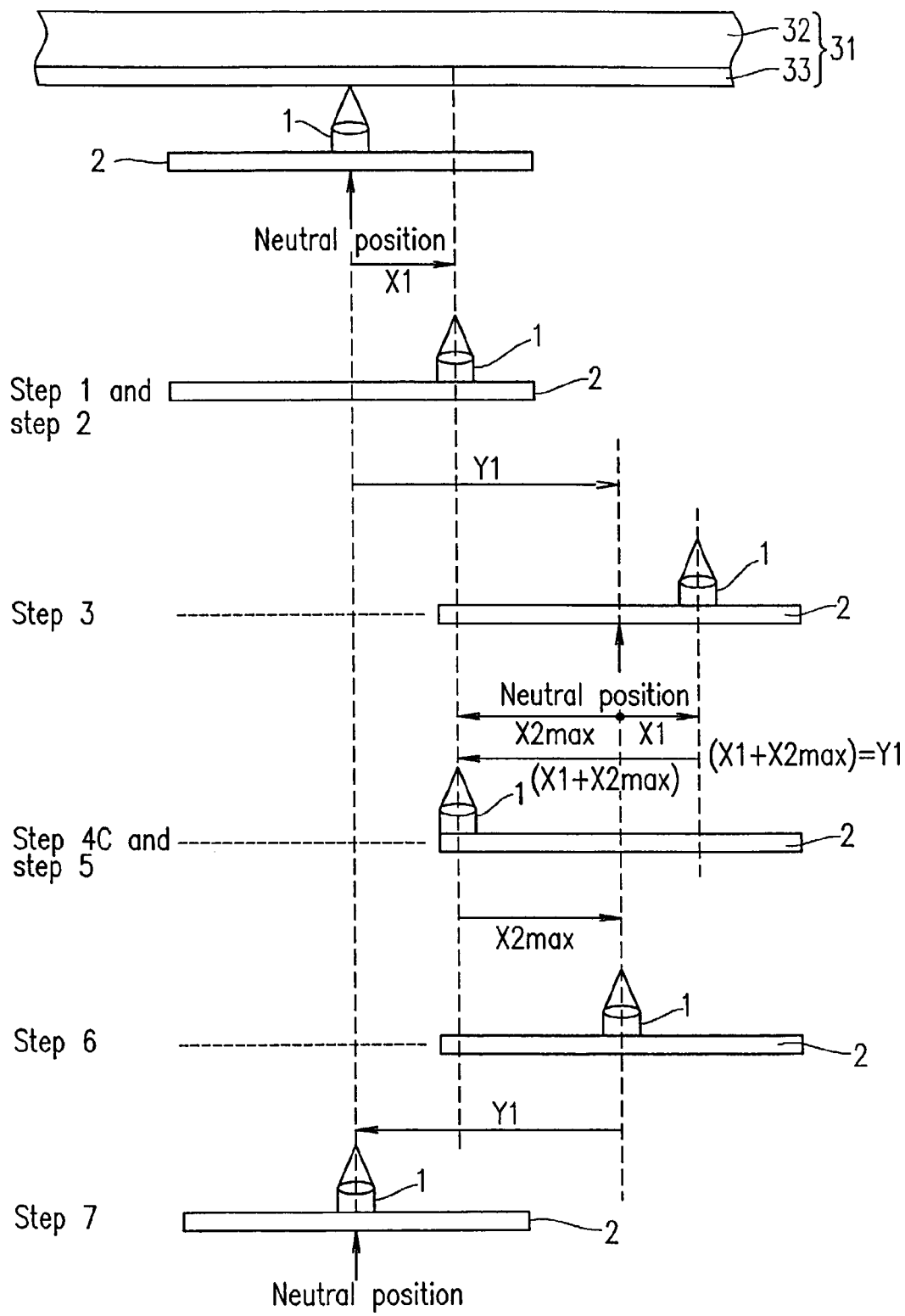
FIG. 8A illustrates a principle of yet another offset measuring method according to the first example.
Figure 8B:
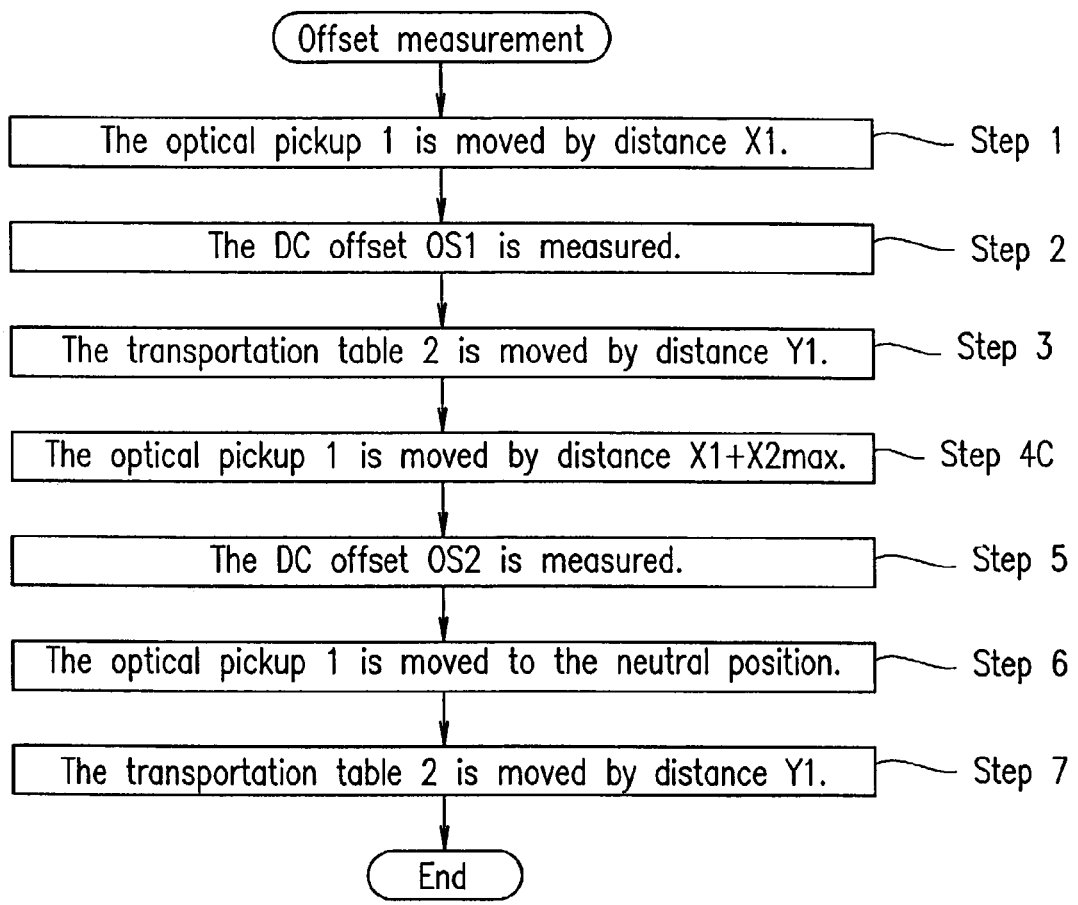
FIG. 8B is a flowchart illustrating the principle of the yet another offset measuring method according to the first example.

FIG. 8A illustrates a principle of yet another offset measuring method according to the first example. FIG. 8B is a flowchart illustrating a procedure of the method shown in FIG. 8A. Identical elements to those in the offset measuring method previously discussed with respect to FIGS. 2 and 3 bear identical reference numerals and the detailed descriptions thereof will be omitted. Unlike the offset measuring method described above, in the offset measuring method shown in FIGS. 8A and 8B, the optical pickup 1 moves from the position which is away from the neutral position on the transportation table 2 by distance X1 in the one radial direction, to a position which is farthest from the neutral position in the other radial direction, i.e., a limit position which is away from the neutral position by distance X2max (step 4C).

As described above, in step 4C, the optical pickup 1 moves to the limit position on the transportation table 2 which is farthest from the neutral position. Therefore, it is not necessary to control the position to which the optical pickup 1 moves in step 4C. This can simplify the structure of the control system for controlling the position of the optical pickup 1 on the transportation table 2.

In step 1 shown in FIGS. 2 and 3, the optical pickup 1 may be moved to a limit position which is farthest from the neutral position in the one radial direction. In step 4 shown in FIGS. 2 and 3, the optical pickup 1 may be moved to the limit position which is farthest from the neutral position in the other radial direction. It is especially preferable to move the optical pickup 1, in step 1, to the limit position which is farthest from the neutral position in the one radial direction, and then move the optical pickup 1, in step 4, to the limit position which is farthest from the neutral position in the other radial direction. The reason is as follows. With such setting, the two positions of the optical pickup 1 at which the DC offset is measured are symmetrical with respect to the neutral position. Therefore, the reliability of the measured lens shift characteristic can be improved. In addition, the structure of the control system for controlling the position of the optical pickup 1 on the transportation table 2 can be simplified.

In step 1 shown in FIGS. 6A and 6B, the optical pickup 1 may be moved to the limit position which is farthest from the neutral position in the one radial direction. In step 4 shown in FIGS. 7A and 7B, the optical pickup 1 may be moved to the limit position which is farthest from the neutral position in the other radial direction.

In the first example, the optical pickup 1 is moved along the radial direction of the disc 31 in order to measure a DC offset. The present invention is not limited to this. The technological idea of the present invention is in causing a first measuring position and a second measuring position, to which an optical beam is directed for measuring a DC offset, to be close to each other. Accordingly, the present invention is applicable to an offset measuring method for measuring a DC offset by inclining the center of the optical axis of the objective lens provided in the optical pickup along the radial direction of the disc.

EXAMPLE 2

Figure 9:
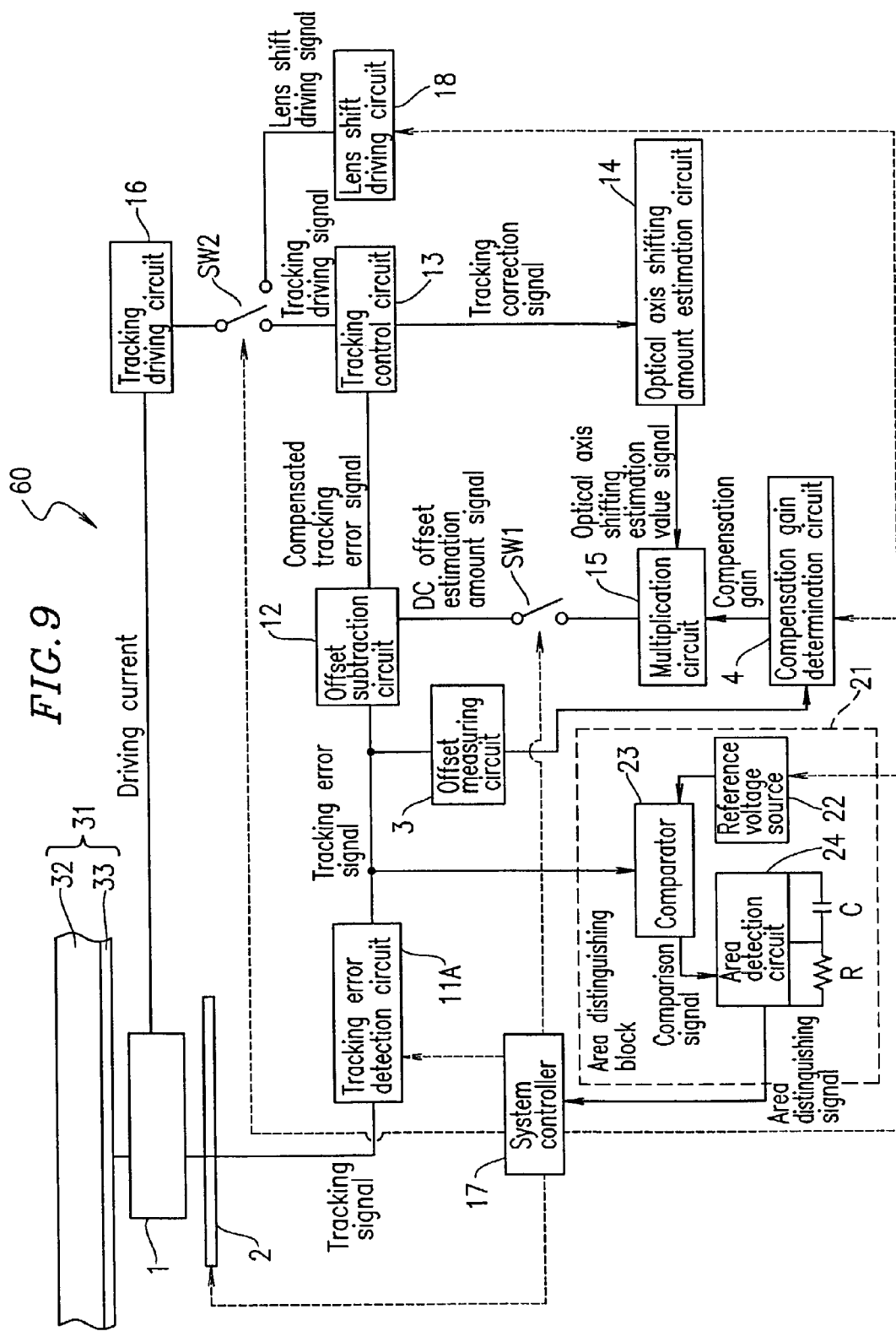
FIG. 9 shows a recording and reproduction apparatus according to a second example.

FIG. 9 shows a structure of a recording and reproduction apparatus 60 according to a second example of the present invention. Identical elements to those of the recording and reproduction apparatus 50 described above in the first example bear identical reference numerals and the detailed descriptions thereof will be omitted. Unlike the recording and reproduction apparatus 50 in the first example, the recording and reproduction apparatus 60 further includes an area distinguishing block 21, and includes a tracking error detection circuit 11A instead of the tracking error detection circuit 11.

The area distinguishing block 21 includes a reference voltage source 22. In response to an instruction from the system controller 17, the reference voltage source 22 selects and outputs a reference voltage Vref1 or Vref2 to a comparator 23. The comparator 23 compares the tracking error signal detected by the tracking error detection circuit 11A and the reference voltage Vref1 or Vref2 output from the comparator 23, and outputs a signal representing the comparison result to an area detection circuit 24. The area detection circuit 24 includes a resistor R and a capacitor C. The area detection circuit 24 generates an area distinguishing signal based on the comparison signal output from the comparator 23 and outputs the area distinguishing signal to the system controller 17.

The recording and reproduction apparatus 60 having the above-described structure operates as follows. In response to an instruction from the system controller 17, the tracking error detection circuit 11A selects, as a system for detecting a tracking error signal from the tracking signal, the above-described push-pull system or a phase difference, and detects a tracking error signal.

Hereinafter, the phase difference system will be described. According to the phase difference system, a tracking error signal is detected utilizing a phenomenon that when a convergence point of an optical beam passes on a track provided on a disc, the intensity pattern of the optical beam reflected by the disc changes over time.

When the convergence point of the optical beam passes the center of a pit recorded on the track, i.e., the center of the track, an output from each of four light detection sections of a photodetector provided in the optical pickup 1 changes its patterns such that a left half and a right half of the waveform are symmetrical with each other. The four light receiving sections are equally divided sections of the photodetector. When the convergence point of the optical beam passes a point in a right half of the track, an output from each of the four light detection sections changes its pattern so as to be rotating counterclockwise. When the convergence point of the optical beam passes a point in a left half of the track, an output from each of the four light detection sections changes its pattern so as to be rotating clockwise. Such a change of the pattern of the output from each of the four light detection sections so as to be rotating becomes more conspicuous as the convergence point of the optical beam becomes farther from the center of the track.

According to the phase difference system, the phases of two signals, each of which is obtained by adding outputs from two light detection sections on a diagonal line of the photodetector, are compared with each other. Based on an advance amount or a delay amount of one phase with respect to the other phase, a tracking error signal which represents the positional shifting between the convergence point of the optical beam and the center of the track is detected. Therefore, by the phase difference system, when there is no pit recorded on the information layer provided on the disc irradiated with the optical beam, no tracking error signal can be detected.

In recordable discs including rewritable discs and write once type discs, a groove-like track is provided in the information layer. In reproduction-only discs, no groove-like track is provided, and information is recorded in the form of pits, which are formed by changing the shape of the information layer provided to be planar. Among the recordable disc, write once type discs have information recorded in the information layer having a groove-like track, in the form of pits which are formed by changing the shape of the information layer. Among the recordable discs, rewritable discs have information recorded in the information layer having a groove-like track, in the form of recording marks formed by changing the arrangement of chemical elements forming the information layer.

Figure 10A:
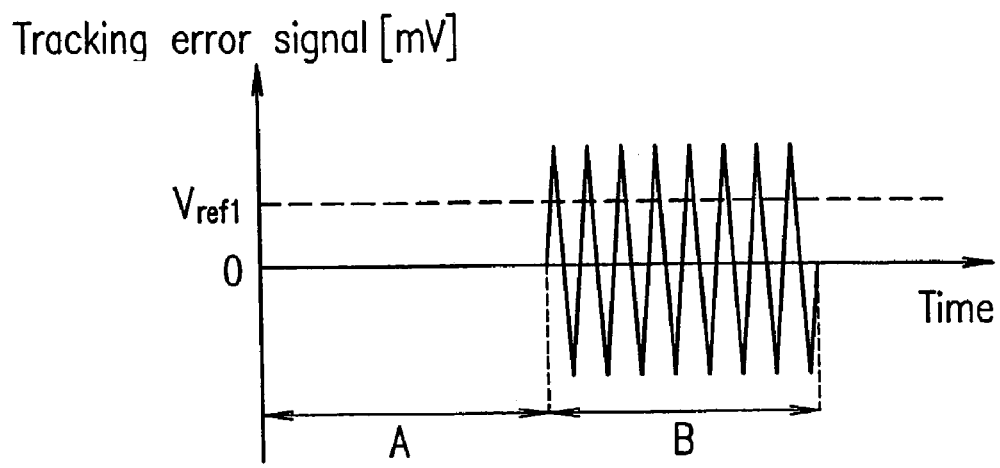
FIG. 10A is a graph illustrating the tracking error signal and time according to the second example.

FIG. 10A is a graph illustrating the relationship between the tracking error signal and time according to the second example. The vertical axis represents a tracking error signal detected by the tracking error detection circuit 11A by the push-pull system, and the horizontal axis represents the time.

It is assumed that the tracking error detection circuit 11A selects the push-pull system as the system for detecting a tracking error signal, in response to an instruction from the system controller 17. In the case of a write once type disc having a groove-like track, information is recorded in the form of pits which are formed by changing the shape of the information layer. An optical beam is directed to an area having information recorded in this manner, or directed to an area with no pits, and the tracking error detection circuit 11A detects a tracking error signal by the push-pull system based on the reflected optical beam. The tracking error signal detected in this manner has a sawtooth waveform as in area B shown in FIG. 10A. The amplitude of the sawtooth-like tracking error signal depends on the reflectance of the disc, structure of the groove, and structure of the pits. The reference voltage Vref1 output from the reference voltage source 22 is set to have a smaller amplitude than that of the sawtooth-like signal as shown in FIG. 10A.

In the case of a reproduction-only disc having a planar information layer, information is recorded in the form of pits which are formed by changing the shape of the information layer. An optical beam is directed to an area having information recorded in this manner, or directed to an area with no pits, and the tracking error detection circuit 11A detects a tracking error signal by the push-pull system based on the reflected optical beam. The tracking error signal detected in this manner has a zero-level amplitude as in area A shown in FIG. 10A.

Figure 10B:
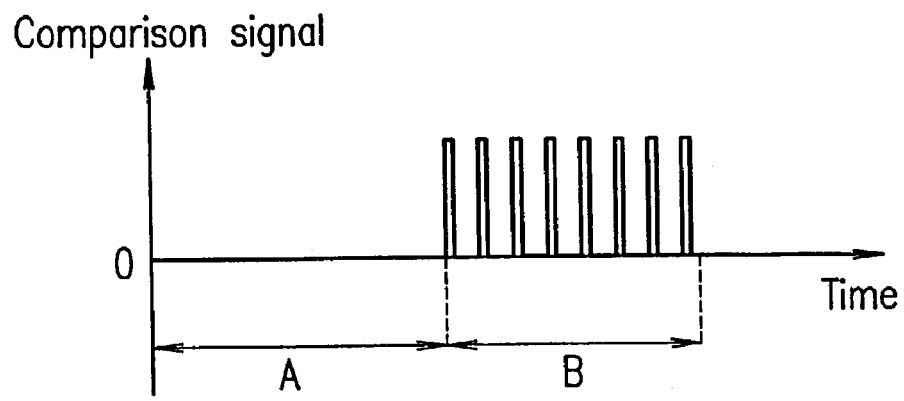
FIG. 10B is a graph illustrating the comparison signal and time according to the second example.

FIG. 10B is a graph illustrating the relationship between the comparison signal and time according to the second example. Based on the tracking error signal (FIG. 11A) detected by the tracking error detection circuit 11A and the reference voltage Vref1, the comparator 23 generates a comparison signal. The comparison signal is obtained as a result of level-slicing the tracking error signal and in the form of a rectangular pulse stream as in area B. The comparator 23 outputs the comparison signal to the area detection circuit 24.

Figure 10C:
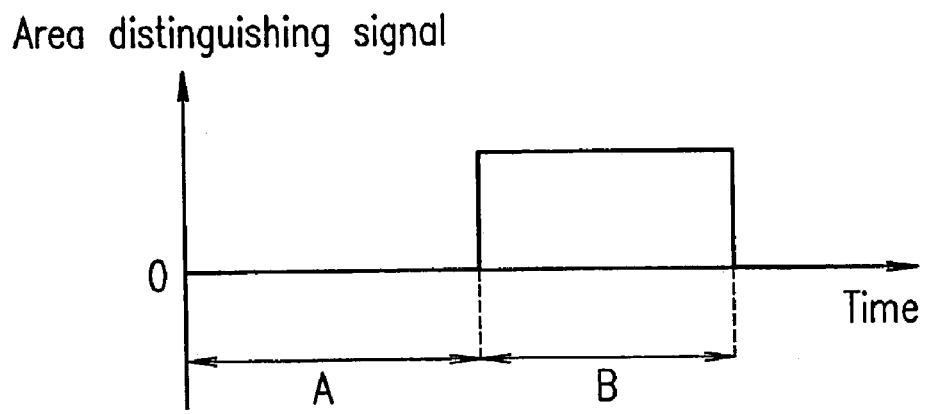
FIG. 10C is a graph illustrating the area distinguishing signal and time according to the second example.

FIG. 10C is a graph illustrating the relationship between the area distinguishing signal and time according to the second example. The area detection circuit 24 converts the comparison signal output from the comparator 23 and shown in FIG. 10B, using the resistor R and the capacitor C included in the area detection circuit 24, into an area distinguishing signal having rectangular pulses. Then, the area detection circuit 24 outputs the rectangular area distinguishing signal to the system controller 17.

Figure 11A:
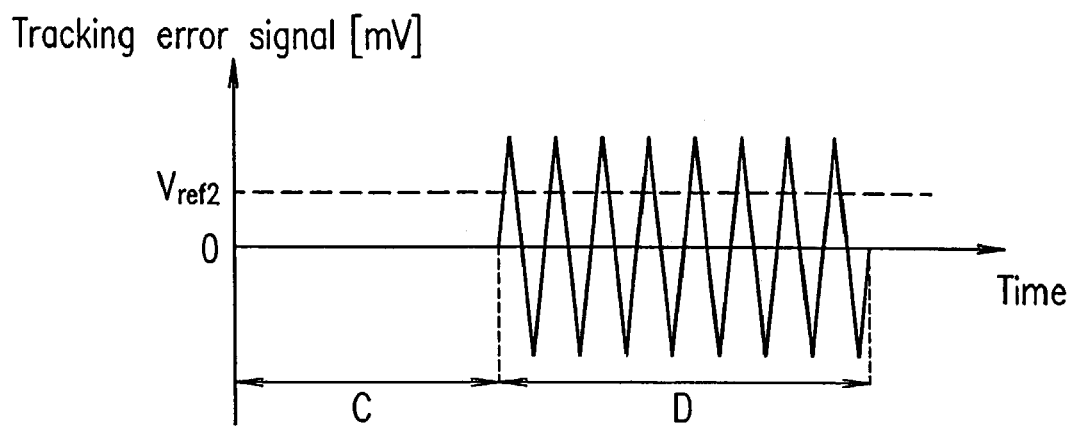
FIG. 11A is a graph illustrating another tracking error signal and time according to the second example.

FIG. 11A is a graph illustrating the relationship between another tracking error signal and time according to the second example. The vertical axis represents a tracking error signal detected by the tracking error detection circuit 11A by the phase difference system, and the horizontal axis represents the time. It is assumed that the tracking error detection circuit 11A selects the phase difference system as the system for detecting a tracking error signal in response to an instruction from the system controller 17.

In the case of a write once type disc having a groove-like track, an optical beam may be directed to an area having no information recorded in the form of pits formed by changing the shape of the information layer. In such a case, the tracking error signal detected by the tracking error detection circuit 11A has a zero-level amplitude as in area C shown in FIG. 11A. In the case of a rewritable disc, an optical beam may be directed to an area having information recorded in the form of recording marks or to an area having no information recorded in the form of recording marks. In the case of are production-only disc having a planar information layer, an optical beam may be directed to an area having no information recorded in the form of pits formed by changing the shape of the information layer. In all such cases also, the obtained tracking error signal has a zero-level amplitude as in area C shown in FIG. 11A.

In the case of a write once type disc, an optical beam may be directed to an area having information recorded in the form of pits formed by changing the shape of the information layer. In the case of a reproduction-only disc, an optical beam may be directed to an area having information recorded in the form of pits formed by changing the shape of the information layer. In these cases, the tracking error signal detected by the tracking error detection circuit 11A by the phase difference system has a sawtooth waveform as in area D shown in FIG. 11A. The reference voltage Vref2 output from the reference voltage source 22 is set to have a smaller amplitude than that of the sawtooth-like signal as shown in FIG. 11A.

Figure 11B:
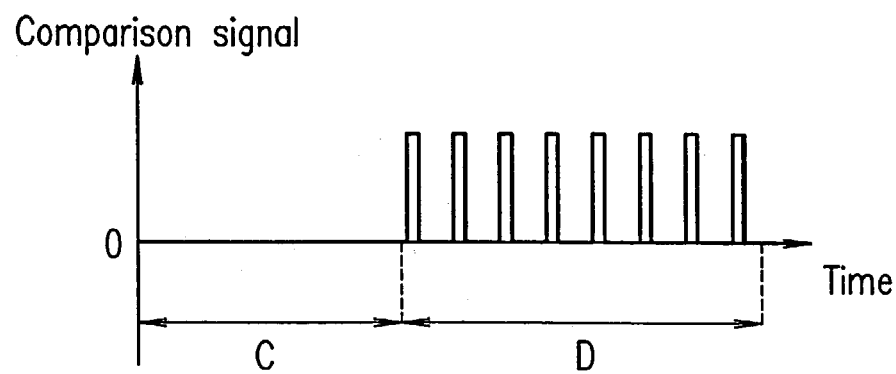
FIG. 11B is a graph illustrating another comparison signal and time according to the second example.

FIG. 11B is a graph illustrating the relationship between the comparison signal and time according to the second example. Based on the tracking error signal (FIG. 11A) detected by the tracking error detection circuit 11A and the reference voltage Vref2, the comparator 23 generates a comparison signal. The comparison signal is obtained as a result of level-slicing the tracking error signal and in the form of a rectangular pulse stream as in area D. The comparator 23 outputs the comparison signal to the area detection circuit 24.

Figure 11C:
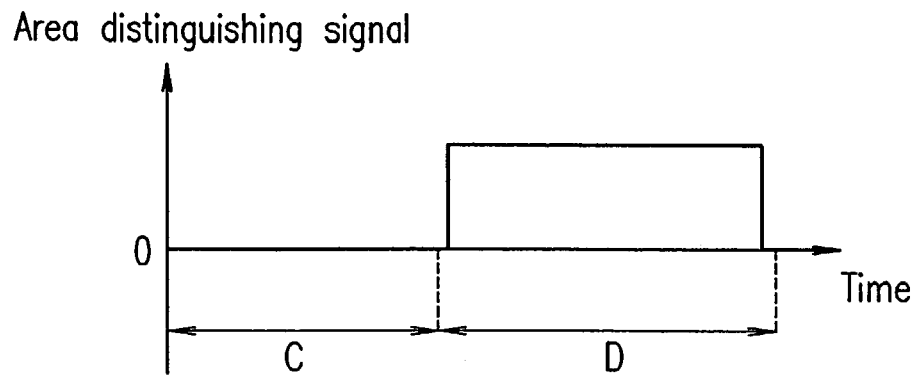
FIG. 11C is a graph illustrating another area distinguishing signal and time according to the second example.

FIG. 11C is a graph illustrating the relationship between the area distinguishing signal and time according to the second example. The area detection circuit 24 converts the comparison signal output from the comparator 23, using the resistor R and the capacitor C included in the area detection circuit 24, into an area distinguishing signal having rectangular pulses. Then, the area detection circuit 24 outputs the rectangular area distinguishing signal to the system controller 17.

An operation of the recording and reproduction apparatus 60 will be described. As an example, a recording operation will be described. First, in response to an instruction from the system controller, the tracking error detection circuit 11A selects the phase difference system as the system for detecting a tracking error signal. The optical pickup 1 irradiates the information layer 33 of the disc 31 with an optical beam. The tracking error detection circuit 11A detects a tracking error signal by the phase difference system. The comparator 23 generates a comparison signal based on the tracking error signal detected by the tracking error detection circuit 11A by the phase difference system and the reference voltage Vref2 output from the reference voltage source 22, and outputs the comparison signal to the area detection circuit 24. The area detection circuit 24 generates an area distinguishing signal based on the comparison signal output from the comparator 23, and outputs the area distinguishing signal to the system controller 17.

Next, in response to an instruction from the system controller 17, the tracking error detection circuit 11A selects the push-pull system as the system for detecting a tracking error signal. The tracking error detection circuit 11A detects a tracking error signal by the push-pull system. The comparator 23 generates a comparison signal based on the tracking error signal detected by the tracking error detection circuit 11A by the push-pull system and the reference voltage Vref1 output from the reference voltage source 22, and outputs the comparison signal to the area detection circuit 24. The area detection circuit 24 generates an area distinguishing signal based on the comparison signal output from the comparator 23, and outputs the area distinguishing signal to the system controller 17.

The system controller 17 turns on the switching circuit SW1 when (i) the tracking error signal detected by the phase difference system has a zero-level amplitude representing area C shown in FIGS. 11A through 11C and therefore the area distinguishing signal output from the area detection circuit 24 has a zero-level amplitude, and also (ii) the tracking error signal detected by the push-pull system has a sawtooth waveform representing area B shown in FIGS. 10A through 10C and therefore the area distinguishing signal has a high-level amplitude. The switching circuit SW1 is turned on in response to an instruction from the system controller 17. A signal representing a DC offset estimation amount which is output from the multiplication circuit 15 is supplied to the offset subtraction circuit 12.

The offset subtraction circuit 12 subtracts a signal representing the DC offset estimation amount from the tracking error signal, and outputs the resultant compensated tracking error signal to the tracking control circuit 13. In response to an instruction from the system controller 17, the switching circuit SW2 selects the tracking driving signal output from the tracking control circuit 13. The tracking driving signal is supplied to the tracking driving circuit 16 via the switching circuit SW2. Based on the tracking driving signal, the tracking driving circuit 16 outputs a driving current to the tracking actuator 6 provided in the optical pickup 1. The tracking actuator 6 controls the objective lens 5 provided in the optical pickup 1 based on the driving current.

As described above, information can be recorded on a write once type disc with the DC offset being compensated for with high precision, without requiring the recorded information to be reproduced.

In the above, the recording operation is described. The DC offset can be compensated for with high precision in a reproduction operation. This is realized as follows in the case of a reproduction operation of write once type discs such as, for example, CD-R discs and DVD-R discs. An optical pickup 1 is moved along a radial direction thereof until the tracking error signal detected by the phase difference system obtains the sawtooth waveform as in area D shown in FIG. 11A (an area having information recorded in the form of pits formed by changing the shape of the information layer having a groove-like track). Then, an optical beam is directed to an area having pits formed by changing the shape of the information layer. Based on the reflected optical beam, a tracking error signal is detected by the push-pull system.

A pit formed on a track provided on an information layer of a write once type disc is often influenced by a change in the edge of the track. This influence of the change in the edge of the track can be eliminated by using an area having no pits for compensation of the DC offset. Thus, the precision of the DC offset measurement can be improved.

In the second example, the phase difference system is first selected to detect whether or not the shape of the information layer has been changed (whether or not there are pits formed). Then, the push-pull system is selected to distinguish whether a groove-like track is formed in the information layer or a planar information layer is formed. The present invention is not limited to this. The push-pull system may be first selected, and then the phase difference system may be selected.

As described above, in the second example, it can be determined whether the area to be used for information recording or reproduction is an area where the DC offset superimposed on the tracking error signal should be compensated for by a signal representing a DC offset estimation amount, without reproducing the information recorded on the information layer.

EXAMPLE 3

FIG. 12 shows a structure of a recording and reproduction apparatus 70 according to a third example of the present invention. Identical elements to those of the recording and reproduction apparatus 50 described above in the first example bear identical reference numerals and the detailed descriptions thereof will be omitted. Unlike the recording and reproduction apparatus 50 in the first example, the recording and reproduction apparatus 70 further includes a DC offset compensation execution distinguishing block 25.

Figure 13A:
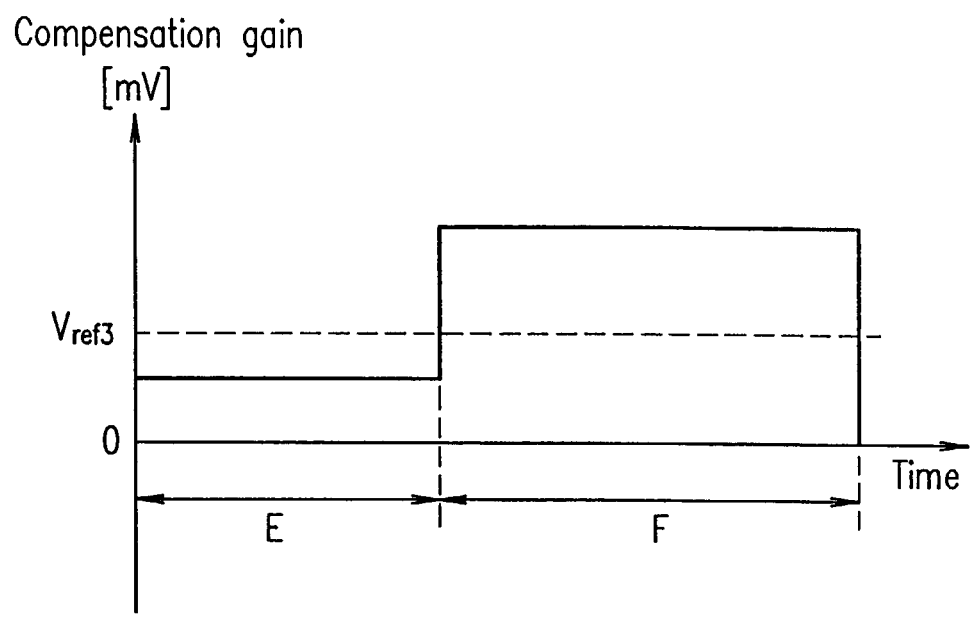
FIG. 13A is a graph illustrating the compensation gain and time according to the third example.
Figure 13B:
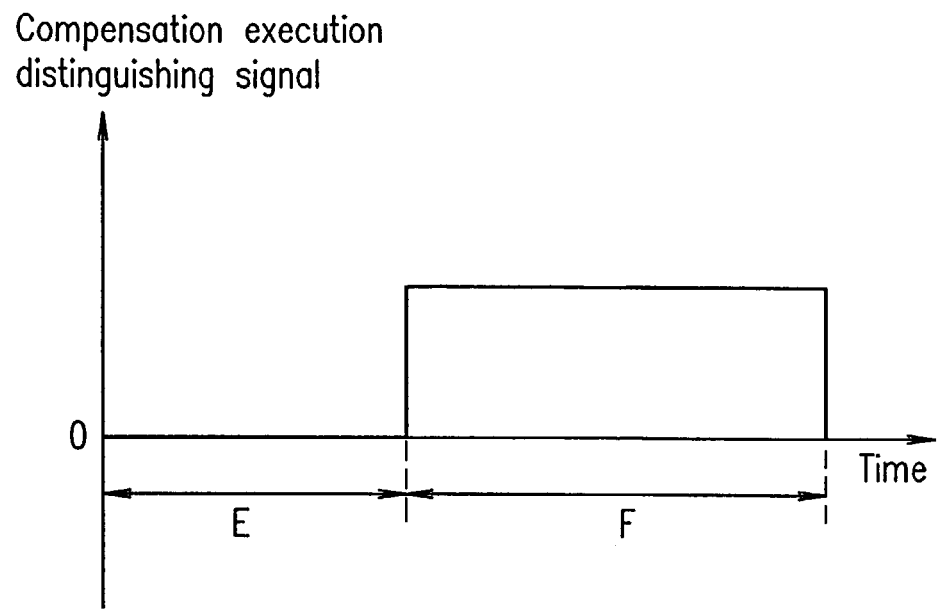
FIG. 13B is a graph illustrating the compensation execution distinguishing signal and time according to the third example.
Figure 14:
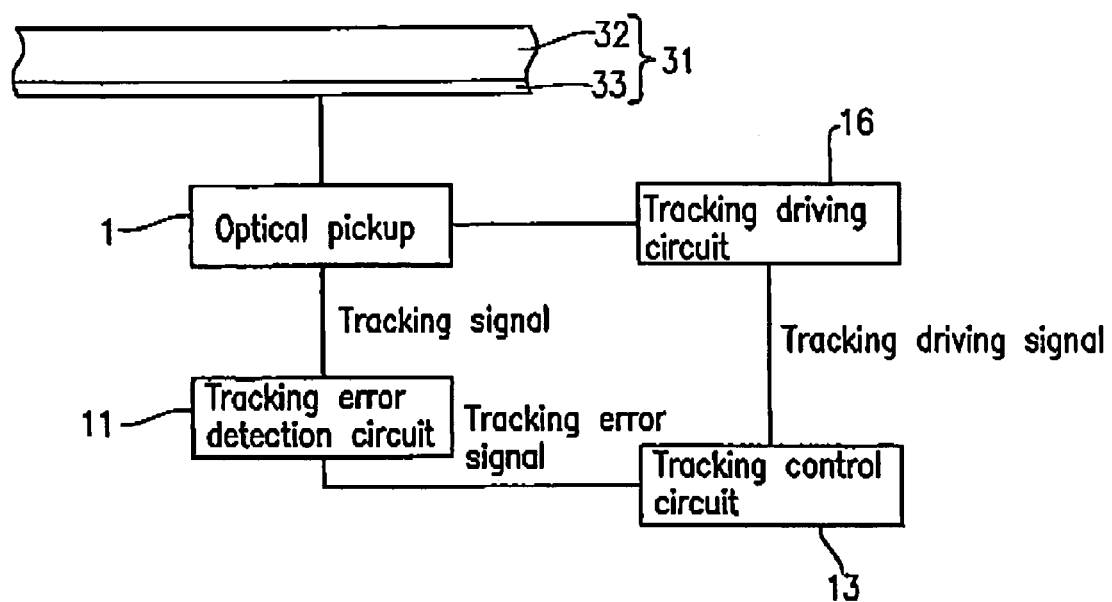
FIG. 14 is a block diagram illustrating a principle of tracking control in a conventional recording and reproduction apparatus.

FIG. 13A is a graph illustrating the relationship between the compensation gain and time according to the third example. FIG. 13B is a graph illustrating the relationship between the compensation execution distinguishing signal and time according to the third example. The DC offset compensation execution distinguishing block 25 includes a reference voltage source 22. The reference voltage source 22 outputs a reference voltage Vref3 to the comparator 23 in response to an instruction from the system controller 17. The reference voltage Vref3 is set to be an initial value of, for example, 0 mV by the system controller 17.

Figure 15:
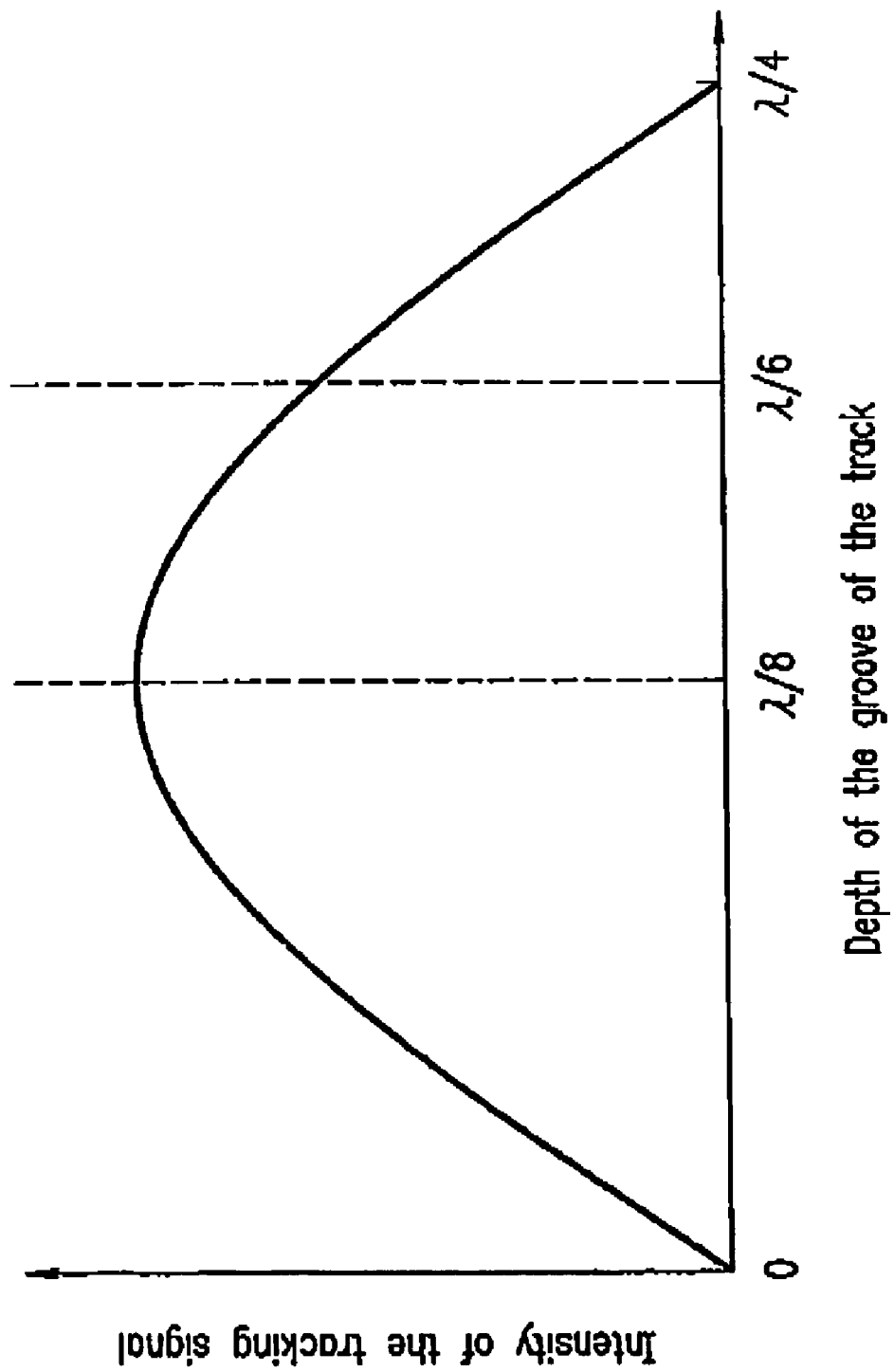
FIG. 15 is a graph illustrating the relationship between the depth of a groove of a track and the intensity of a tracking error signal.
Figure 16:
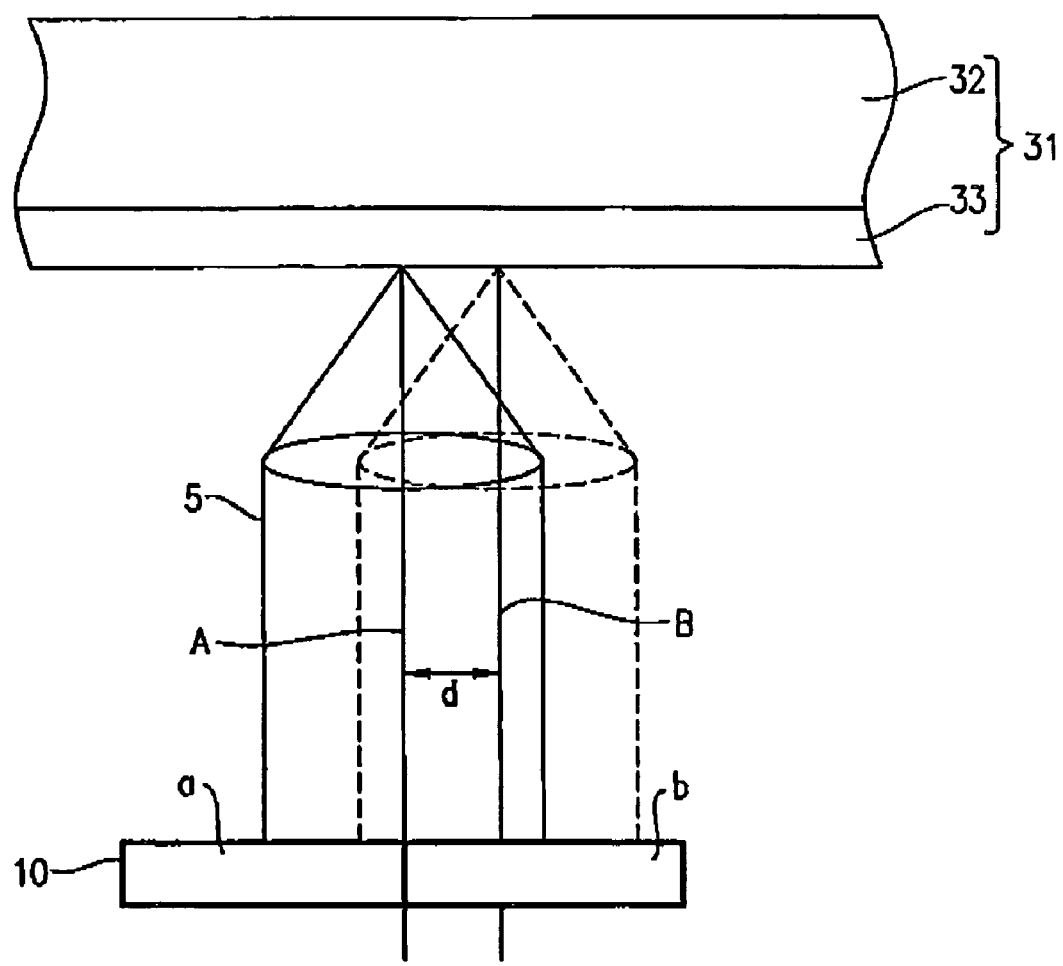
FIG. 16 illustrates the positional relationship between the central position of an optical beam and the light receiving sections.
Figure 17:
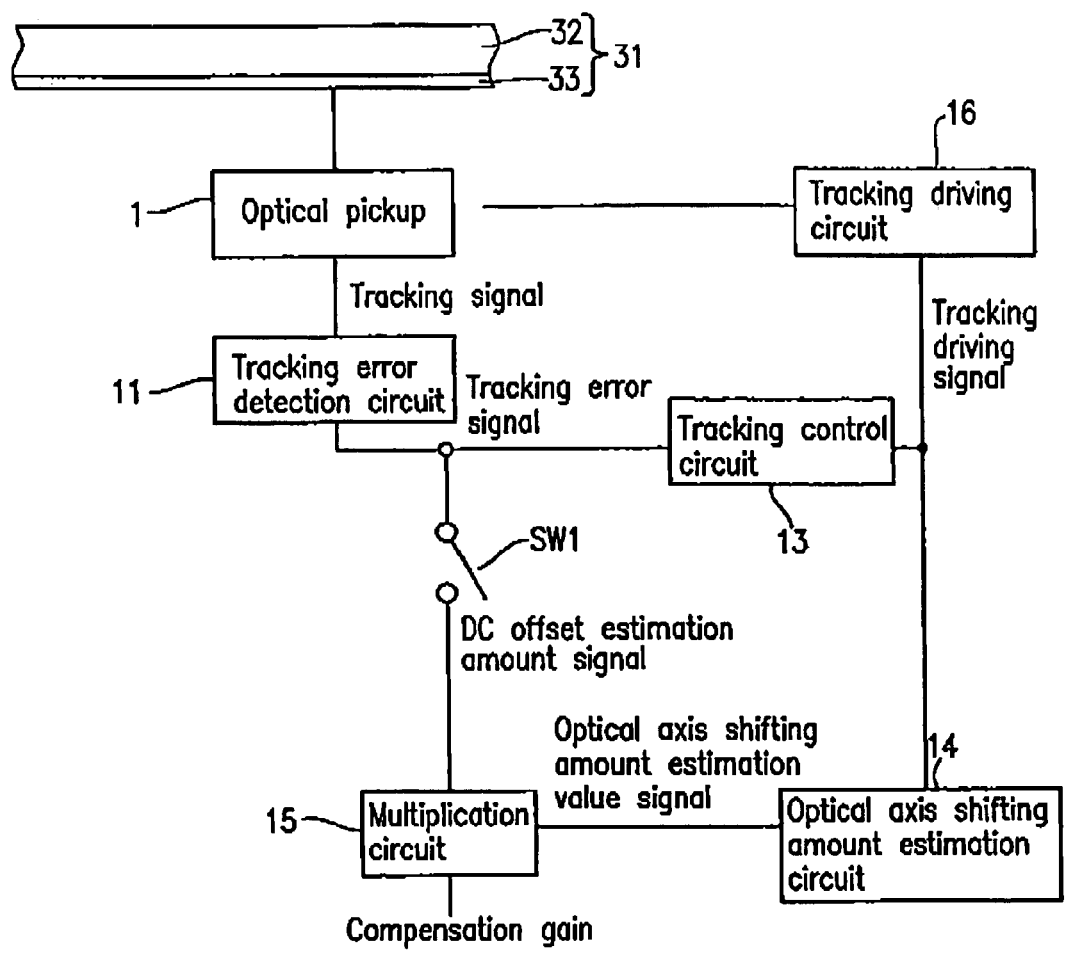
FIG. 17 is a block diagram illustrating a principle of conventional tracking control having a function of compensating for an offset.
Figure 18:
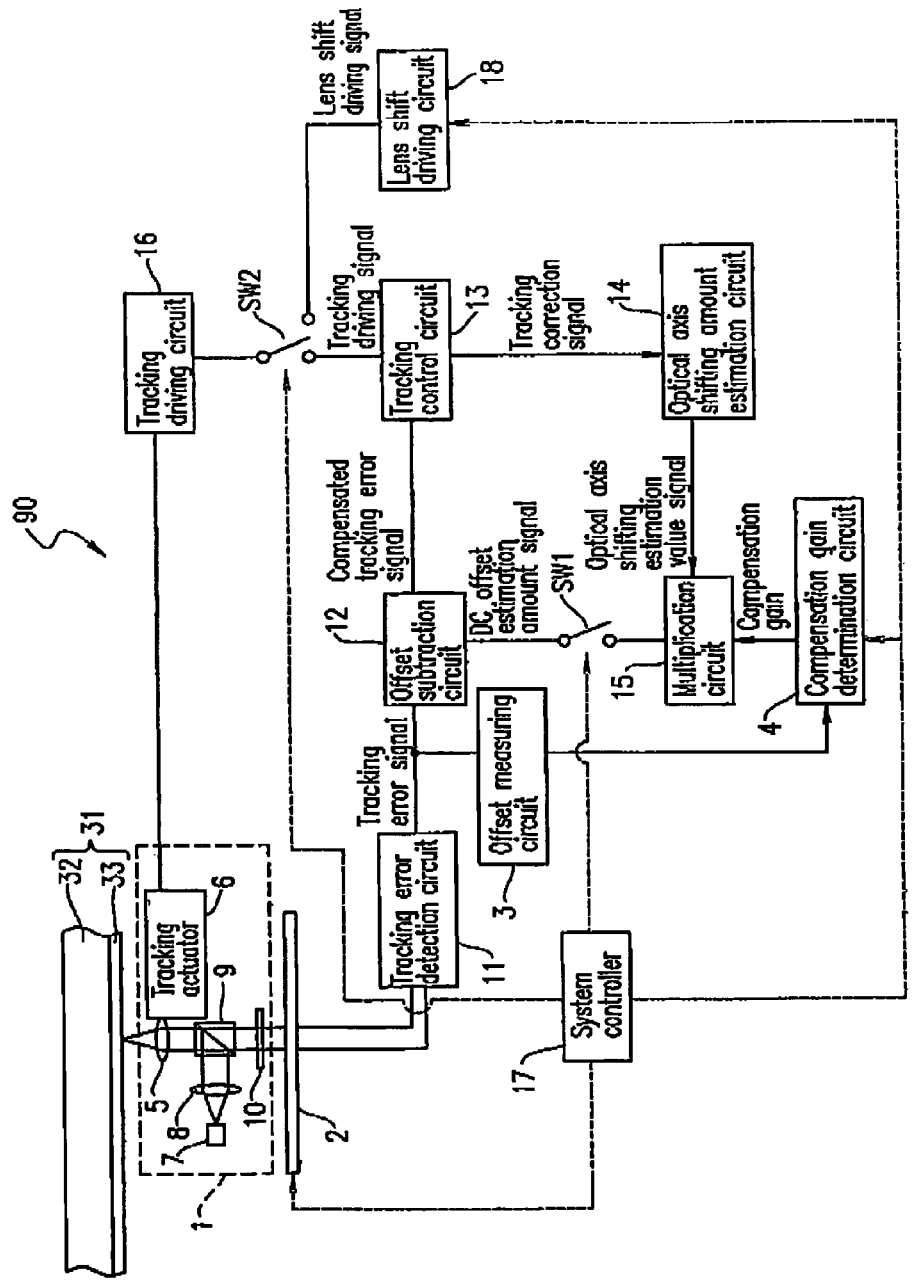
FIG. 18 shows a structure of a conventional recording and reproduction apparatus.
Figure 19:
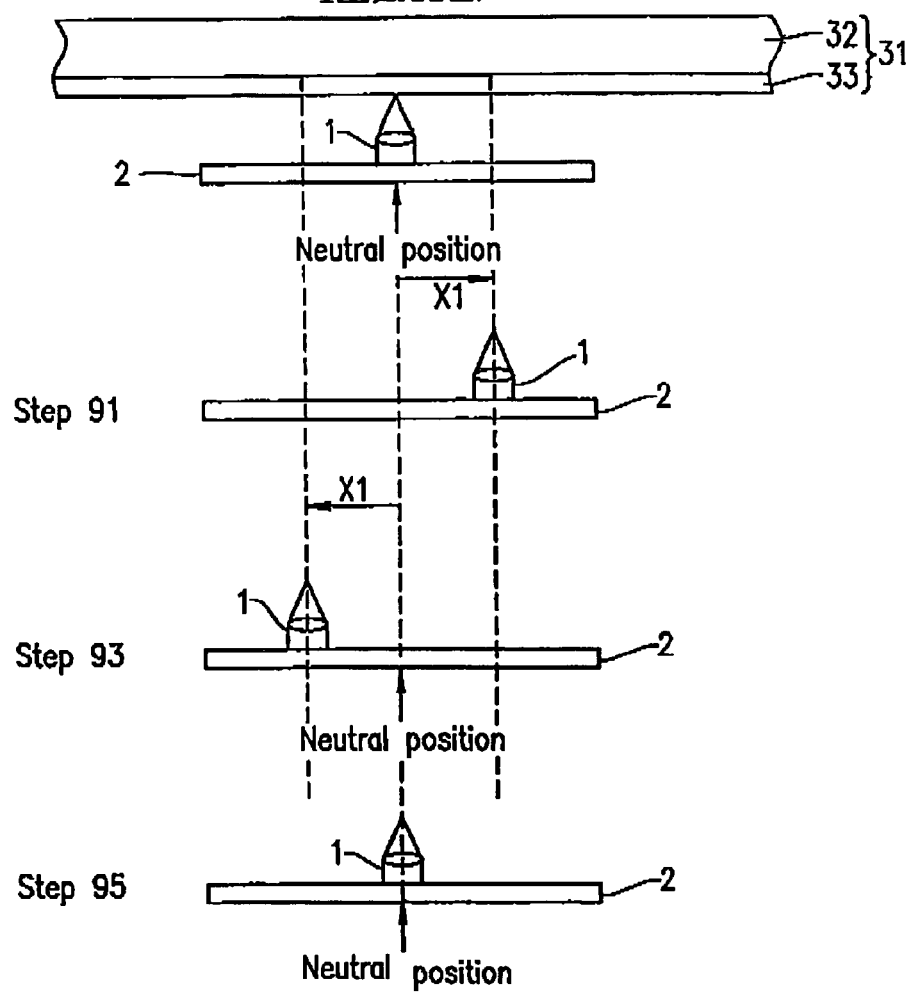
FIG. 19 shows a principle of a conventional offset measuring method.
Figure 20:
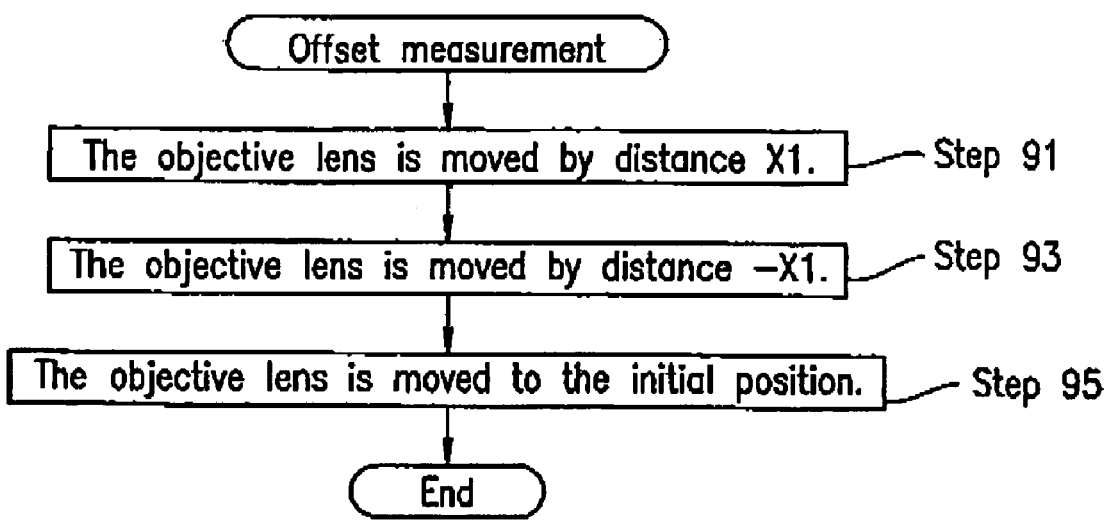
FIG. 20 is a flowchart illustrating the principle of the conventional offset measuring method.
Figure 21A:
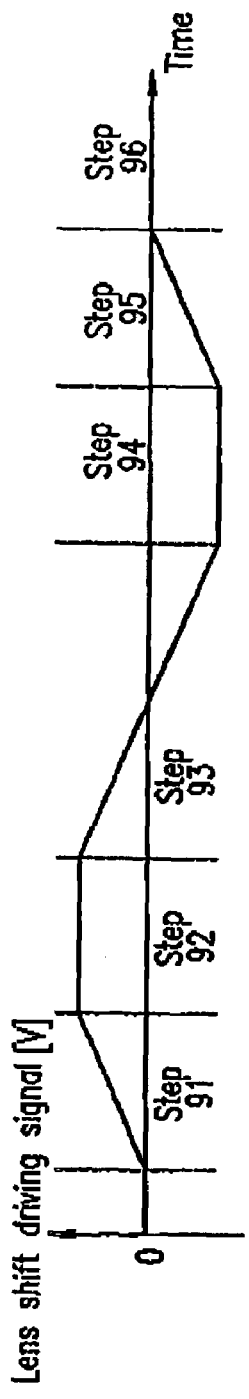
FIG. 21A is a graph illustrating the relationship between the lens shift driving signal and time in the conventional art.
Figure 21B:
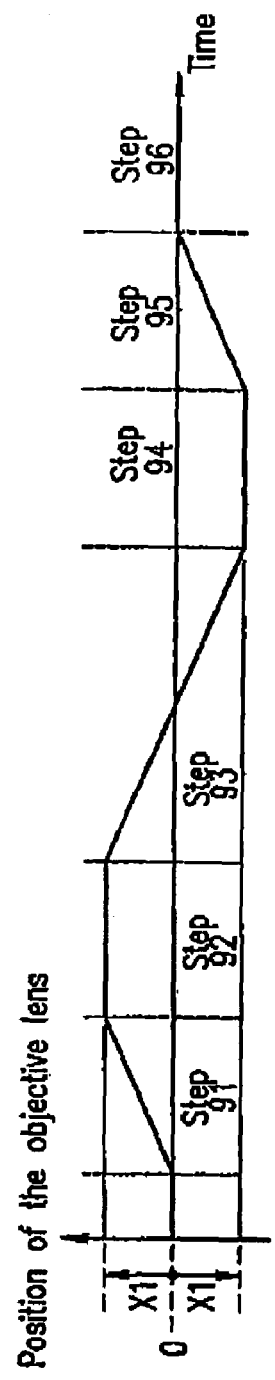
FIG. 21B is a graph illustrating the relationship between the position of the objective lens and time in the conventional art.
Figure 21C:
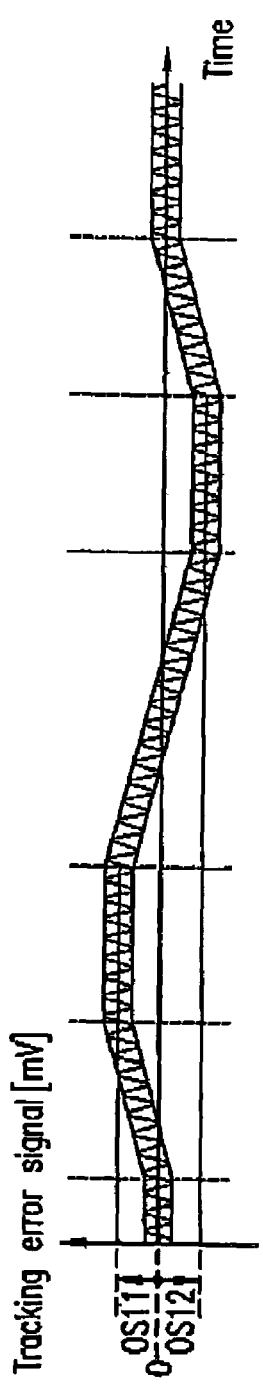
FIG. 21C is a graph illustrating the relationship between the tracking error signal and time in the conventional art.

As described above with reference to FIG. 15, when the depth of the groove formed in the track of the disc is in equal to or more than $\lambda/8$ and equal to or less than $\lambda/6$, the intensity of the tracking signal is high. Therefore, the DC offset superimposed on the tracking error signal is large. As a result, as shown in area F of FIG. 13A, the compensation gain is larger than the reference voltage Vref3. When the depth of the groove exceeds $\lambda/6$, the intensity of the tracking signal is lowered. Therefore, the DC offset super imposed on the tracking error signal becomes much smaller. As a result, as shown in area E of FIG. 13A, the compensation gain becomes equal to or less than the reference voltage Vref3.

The comparator 23 generates a compensation execution distinguishing signal shown in FIG. 13B based on the voltage of the signal representing the compensation gain (FIG. 13A) which is output from the compensation gain determination circuit 4 and the reference voltage Vref3 output from the reference voltage source 22. Then, the comparator 23 outputs the compensation execution distinguishing signal to the system controller 17. The compensation execution distinguishing signal has a HIGH level in area F where the voltage of the signal representing the compensation gain is larger than the reference voltage Vref3. The compensation execution distinguishing signal has a LOW level in area E where the voltage of the signal representing the compensation gain is equal to or less than the reference voltage Vref3.

The system controller 17 turns on the switching circuit SW1 when the compensation execution distinguishing signal output from the comparator 23 has a HIGH level, and turns off the switching circuit SW1 when the compensation execution distinguishing signal has a LOW level.

In this manner, when the compensation gain for compensating for a DC offset superimposed on the tracking error signal due to the lens optical axis shifting is larger than a prescribed reference voltage, the function for compensating for the DC offset is turned on. When the compensation gain is equal to or less than the prescribed reference voltage, the function for compensating for the DC offset is turned off.

As described above, in the third example, the function of compensating for the DC offset is turned on or off in accordance with the value of the compensation gain determined by the compensation gain determination circuit 4. Therefore, compensation for the DC offset can be performed only for an area where the DC offset is required to be compensated for.

Consequently, the structure of tracking control for an area, where the DC offset superimposed on the tracking error signal is small and thus is not required to be compensated for, can be simplified. In addition, instability of tracking control, which may be caused by compensating for the DC offset in an area where the compensation is not necessary, can be prevented.

INDUSTRIAL APPLICABILITY

As described above, the present invention provides an offset measuring, with high precision, method and a recording and reproduction apparatus for measuring a DC offset superimposed on a tracking error signal due to lens optical axis shifting.

The present invention also provides an offset measuring method and a recording and reproduction apparatus for determining an area on a disc where a DC offset superimposed on a tracking error signal should be compensated for by a signal representing a DC offset estimation amount.

The invention claimed is:

1. An offset measuring method for measuring an offset superimposed on a tracking error signal based on an optical beam reflected by an information medium, in a recording and reproduction apparatus including an optical pickup placed on transportation means so as to be driven along a radial direction of the information medium, the method comprising:

a first offset amount measuring step of directing an optical beam toward a first measuring position on the information medium from the optical pickup, thereby measuring a first offset amount based on the optical beam reflected at the first measuring position;

a transportation means moving step of, after the first offset amount measuring step, moving the transportation means having the optical pickup placed thereon by a first distance in a first direction along the radial direction;

a first optical pickup driving step of driving the optical pickup on the transportation means by a second distance, which is substantially equal to the first distance, in a second direction which is opposite to the first direction; and a second offset amount measuring step of, after the transportation means moving step and the first optical pickup driving step, directing an optical beam toward a second measuring position on the information medium from the optical pickup, thereby measuring a second offset amount based on the optical beam reflected at the second measuring position.

2. An offset measuring method according to claim 1, wherein the transportation means moving step is performed before the first optical pickup driving step.

3. An offset measuring method according to claim 1, further comprising a second optical pickup driving step of, before the first offset amount measuring step, driving the optical pickup on the transportation means by a third distance in a third direction along the radial direction.

4. An offset measuring method according to claim 3, wherein the third direction is identical to the first direction.

5. An offset measuring method according to claim 3, wherein the third direction is opposite to the first direction.

6. An offset measuring method according to claim 3, wherein the second optical pickup driving step drives the optical pickup by the third distance from a neutral position on the transportation means.

7. An offset measuring method according to claim 1, wherein:
the information medium has a groove formed therein, to which the optical beam is to be directed,
the optical beam has a wavelength of $\lambda$, and
the groove has a depth of equal to or more than $\lambda/8$ and equal to or less than $\lambda/6$.

8. An offset measuring method according to claim 1, wherein an information signal is recorded on the information medium by light-heat conversion.

9. An offset measuring method according to claim 1, further comprising a compensation gain determination step of determining a compensation gain which represents an offset characteristic of the optical pickup with respect to the transportation means, based on the first offset amount measured by the first offset amount measuring step and the second offset amount measured by the second offset amount measuring step.

10. An offset measuring method according to claim 9, further comprising a step of compensating for the offset of the optical pickup with respect to the transportation means, in accordance with a value of the compensation gain determined by the compensation gain determination step.

11. An offset measuring method according to claim 10, further comprising:
a first tracking error signal detection step of directing an optical beam toward a third measuring position on the information medium along the radial direction from the optical pickup, thereby detecting a first tracking error signal by a push-pull system based on the optical beam reflected at the third measuring position;
a second tracking error signal detection step of detecting a second tracking error signal by a phase difference system based on the optical beam reflected at the third measuring position; and
a step of determining whether or not to compensate for the offset of the optical pickup with respect to the transportation means, based on the first tracking error signal detected by the first tracking error signal detection step and the second tracking error signal detected by the second tracking error signal detection step.

12. A recording and reproduction apparatus, comprising:
an optical pickup placed on transportation means so as to be driven along a radial direction of an information medium;
offset amount measuring means for measuring a first offset amount based on an optical beam directed toward a first measuring position on the information medium from the optical pickup and reflected at the first measuring position;
control means for, after the offset amount measuring means measures the first offset amount, moving the transportation means having the optical pickup placed thereon by a first distance in a first direction along the radial direction; and
driving means for, after the offset amount measuring means measures the first offset amount, driving the optical pickup on the transportation means by a second distance, which is substantially equal to the first distance, in a second direction, which is opposite to the first direction,
wherein the offset amount measuring means measures a second offset amount based on an optical beam, which is directed to a second measuring position on the information medium from the optical pickup after the control means moves the transportation means by the first distance in the first direction and further after the driving means drives the optical pickup by the second distance in the second direction, and then is reflected at the second measuring position.

* * * * *